United States Patent [19]

Aubie et al.

[11] Patent Number: 4,912,668

[45] Date of Patent: Mar. 27, 1990

[54] MONO-DIMENSIONAL REVERSE COSINE TRANSFORM COMPUTING DEVICE

[75] Inventors: Jean Y. Aubie, Rennes; Yves M. Le Pannerer, Gregoire; Alain Ferre, Cresson Sevigne; Yannick Villalon, Rennes, all of France

[73] Assignee: Thomson-CSF, Paris, France

[21] Appl. No.: 58,319

[22] Filed: Jun. 5, 1987

[30] Foreign Application Priority Data

Jun. 6, 1986 [FR] France ................................ 86 08219

[51] Int. Cl.$^4$ ............................................. G06F 7/38
[52] U.S. Cl. ................................................. 364/725
[58] Field of Search ........... 364/725, 726, 727, 724.01, 364/715.06, 748

[56] References Cited

U.S. PATENT DOCUMENTS

| | | | |
|---|---|---|---|
| 3,746,848 | 7/1973 | Clary | 364/726 |
| 4,449,194 | 5/1984 | Wilhelm | 364/725 |
| 4,675,836 | 6/1987 | Arnould et al. | 364/725 |
| 4,679,163 | 7/1987 | Arnould et al. | 364/725 |

OTHER PUBLICATIONS

Chen et al., "A Fast Computational Algorithm for the Discrete Cosine Transform", IEEE Transactions on Communications, vol. COM-25, No. 9, Sep. 1977, pp. 1004–1009.
Kamangar et al., "Fast Algorithms for the 2-D Discrete Cosine Transform", IEEE Transactions on Computers, vol. C-31, No. 9, Sep. 1982, pp. 899–906.
Lee, "A New Algorithm to Compute the Discrete", IEEE Transactions on Acoustic, Speech & Signal Processing, vol. ASSP-32, No. 6, Dec. 1984, pp. 1243–1245.
Moreno Del Callado et al., "Fast Haar Transform Algorithm: A 6809-Based Realtime Evaluation", Microprocessors and Microsystems, vol. 8, No. 3, Apr. 1984, pp. 126–135.
Smith, "Computer Aided Design of a PLA Implemented Fast Wash-Hadamard Transform Device", Proceedings of the 5th International Conference on Pattern Recognition, vol. 1, Dec. 1980, pp. 183–191.
IEEE Transactions on Communications, vol. COM-32, No. 3, Mar. 1984, pp. 225–232, Wen-Hsiung Chen, Member, IEEE and William K. Pratt, Senior Member IEEE.
IEEE Transactions on Acoustics, Speech and Signal Processing, ASSP-32 (1984) Dec., No. 6, New York, USA, Byeong Gi Lee, pp. 1243–1245.

*Primary Examiner*—Gary V. Harkcom
*Assistant Examiner*—Long T. Nguyen
*Attorney, Agent, or Firm*—Cushman, Darby & Cushman

[57] ABSTRACT

A device for computing 16 mono-dimensional direct cosine transforms from 16 luminance values having an input memory. A first computing device delivers respectively two values of the form $A+B$ and $(A-B) \times D$, where A and B are two values applied respectively to two inputs of the first computing device and where D is a predetermined coefficient. A first intermediate value storage device uses the first computing device for 32 similar operations. A second computing device delivers a value of the form $E+G$, where E and G are two values applied consecutively to the input of the second computing device. A second intermediate value storage device reuses the second computing device for 17 additional operations. Finally, a device changes the order of the transformed values.

21 Claims, 14 Drawing Sheets

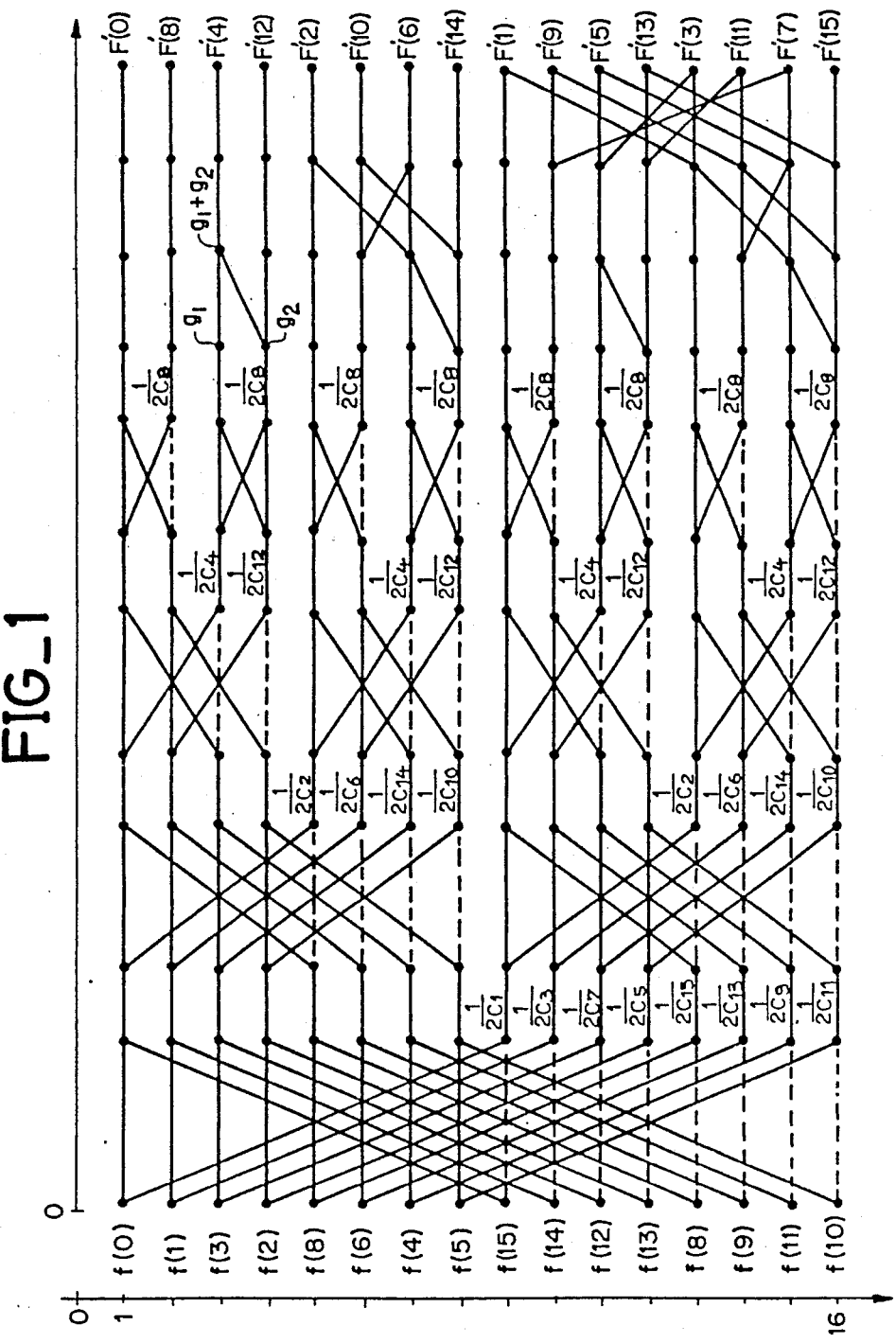
FIG_1

FIG_2
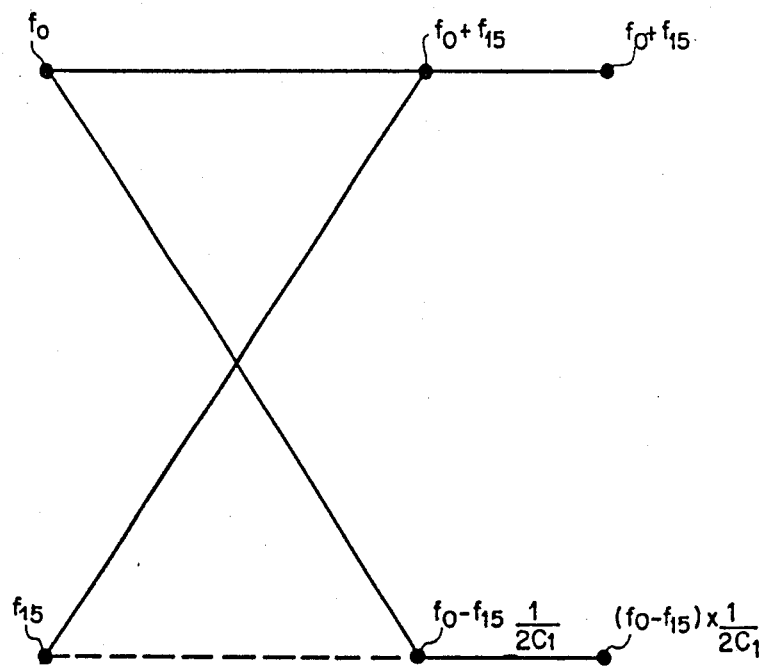
FIG_3
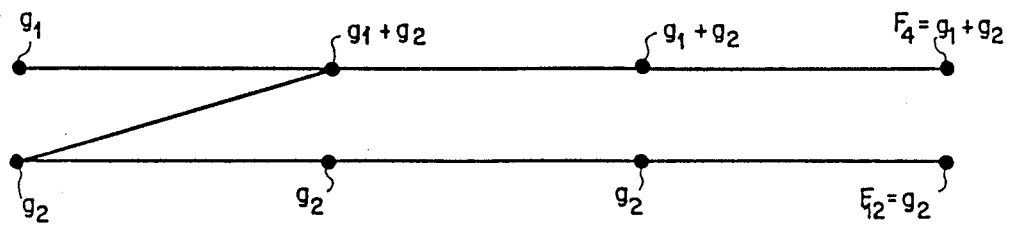

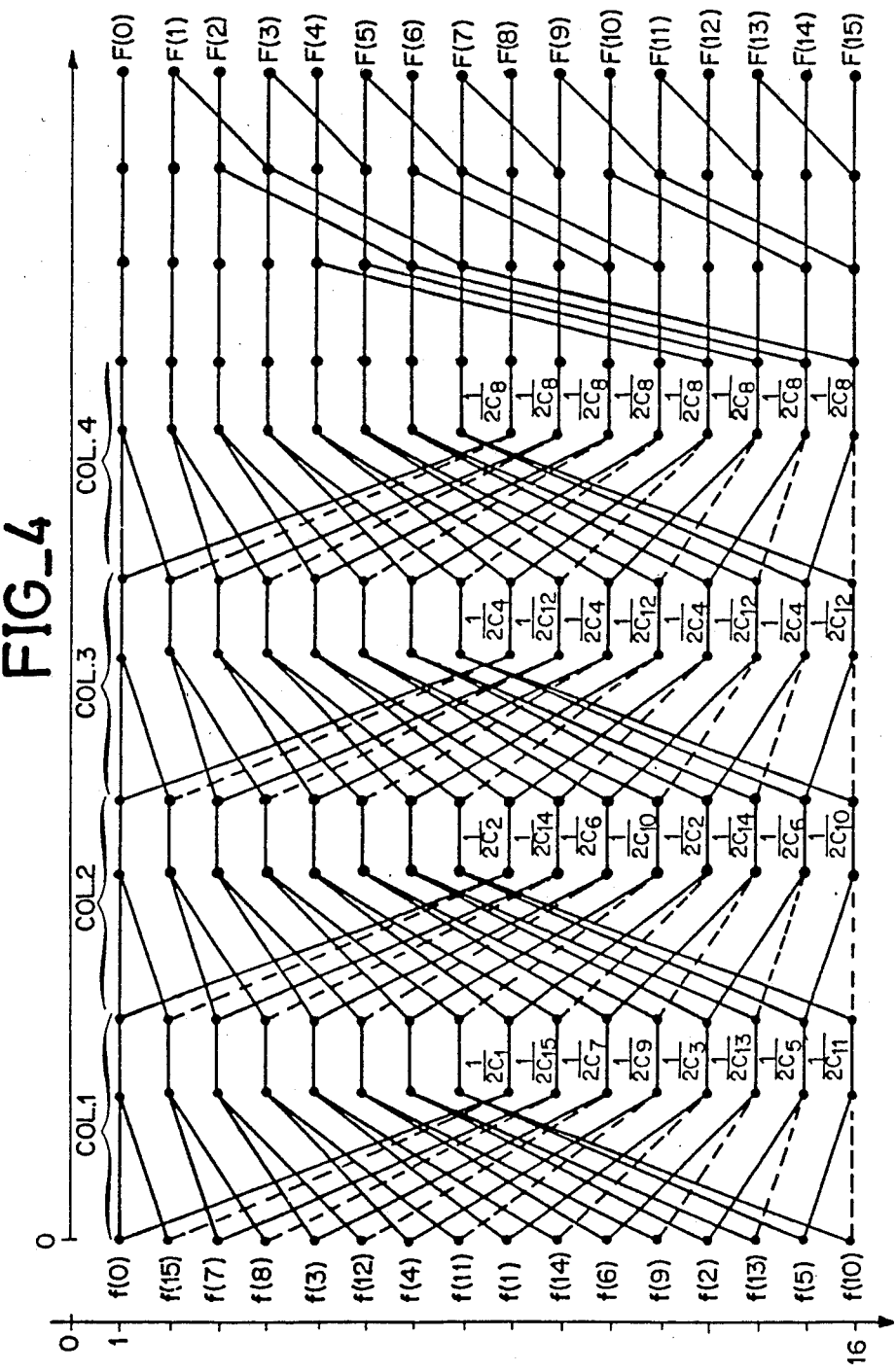
FIG_4

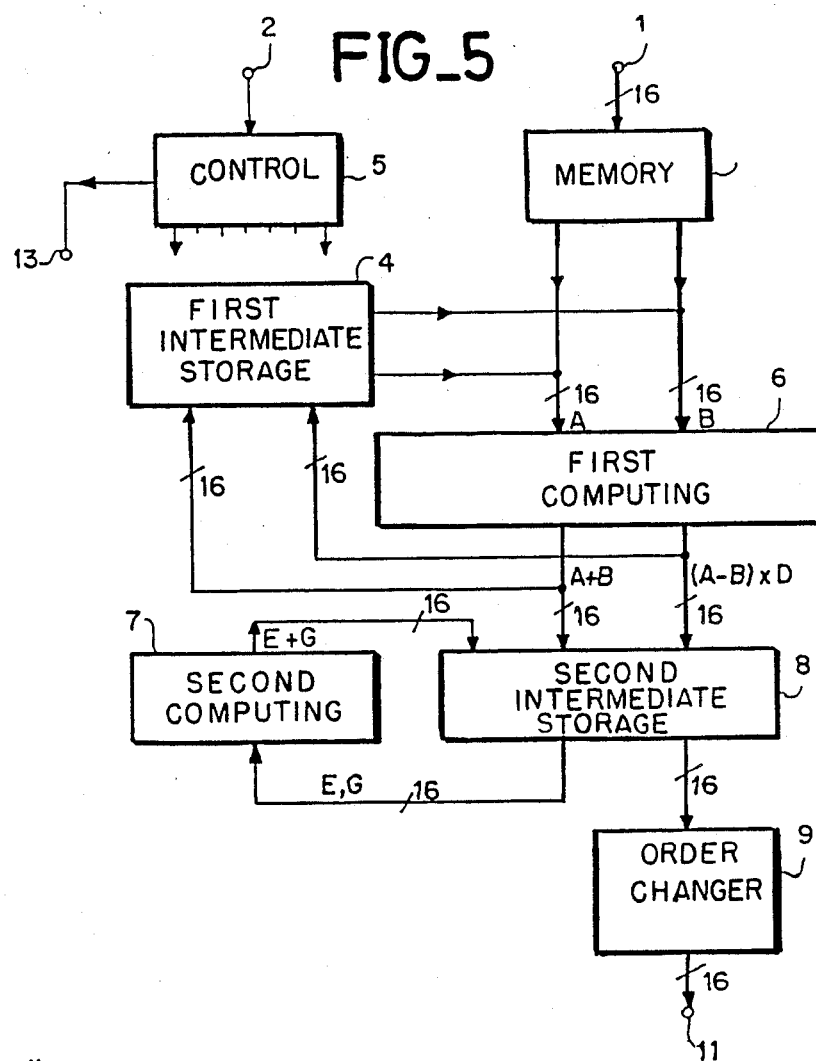
FIG_5
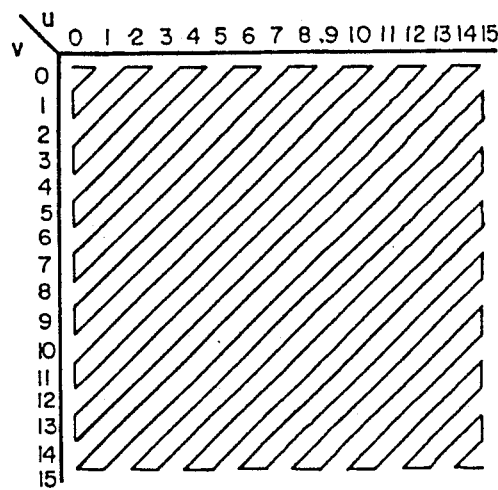
FIG_6

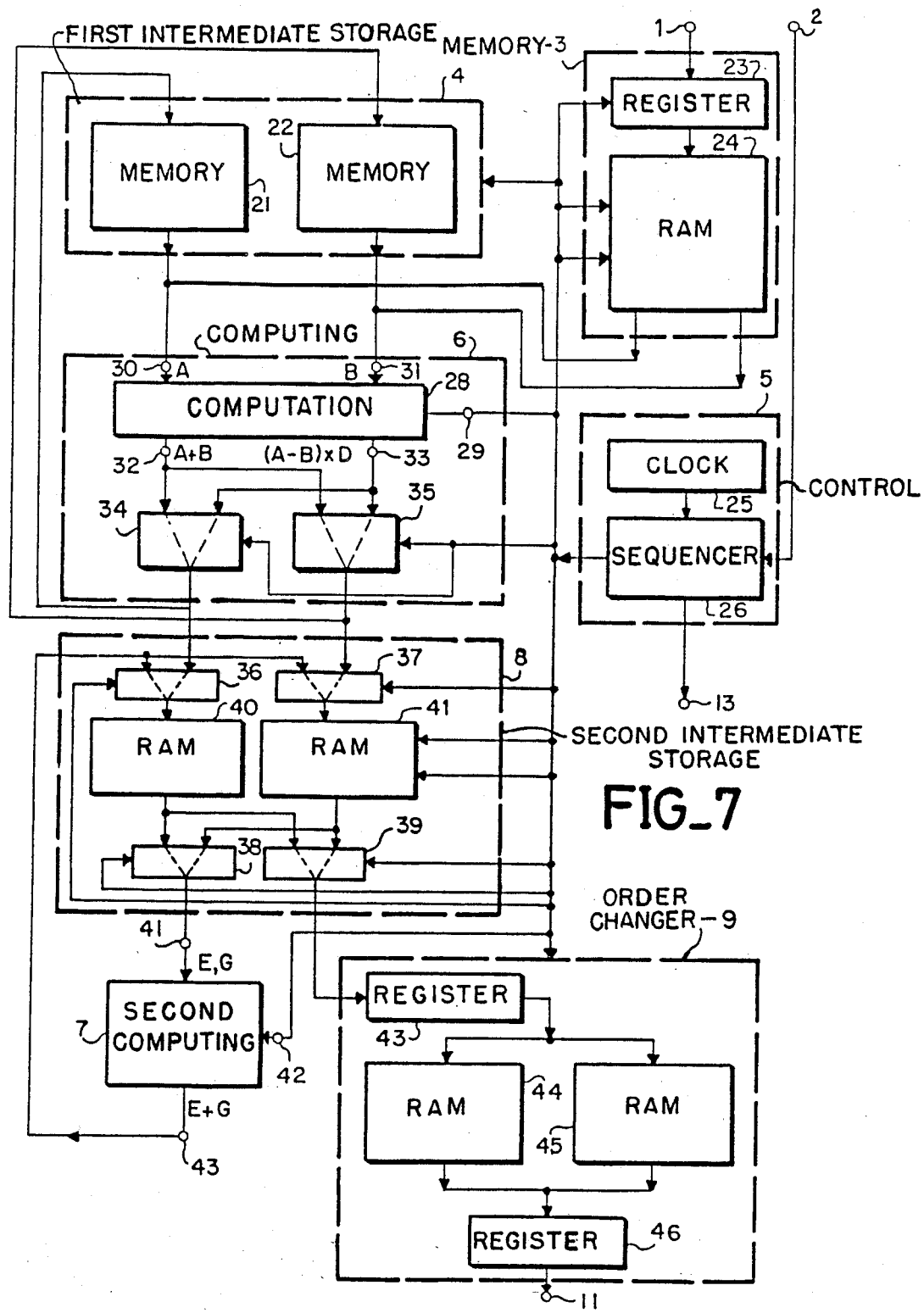
FIG_7

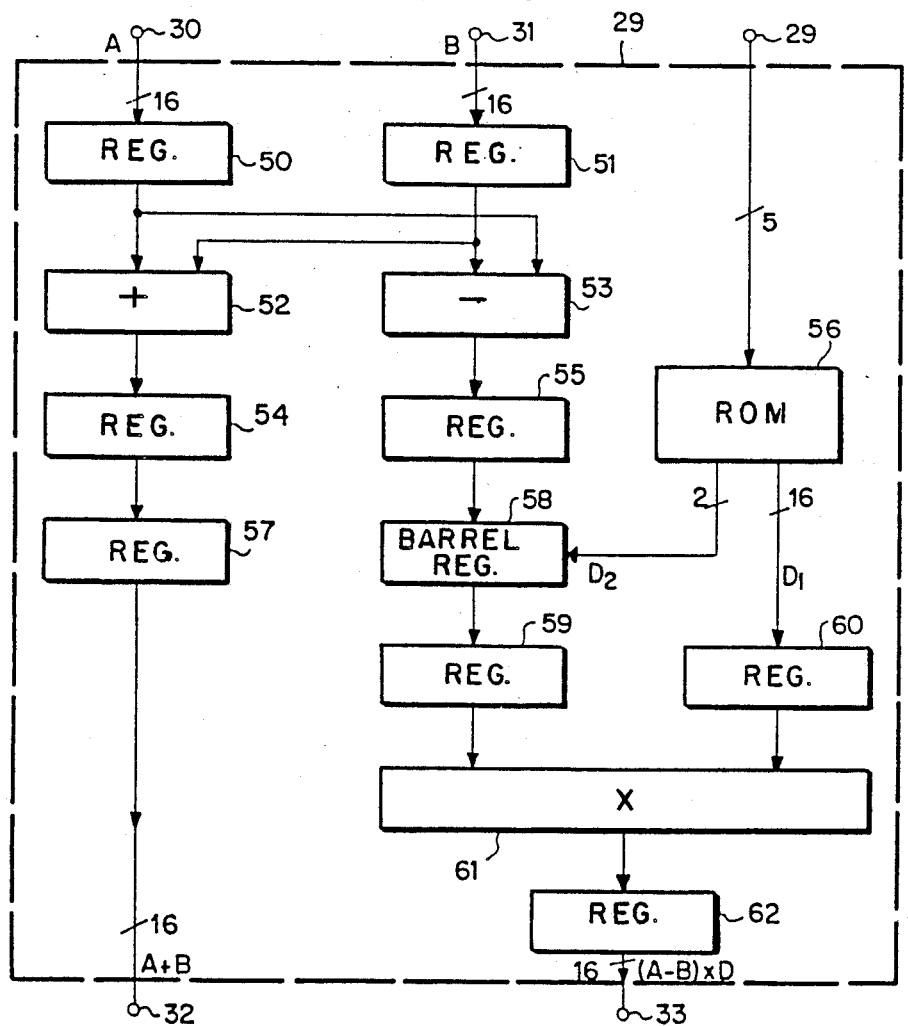
FIG_8
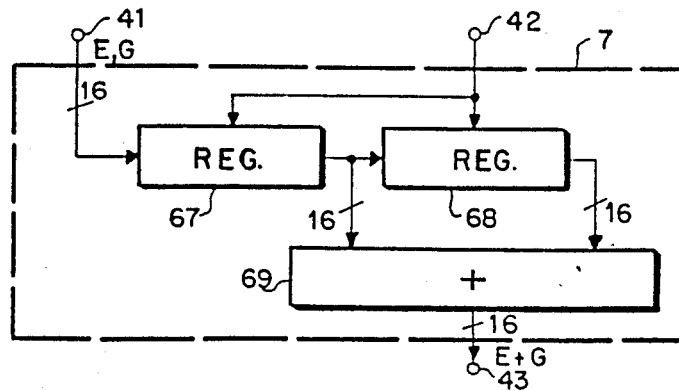
FIG_9

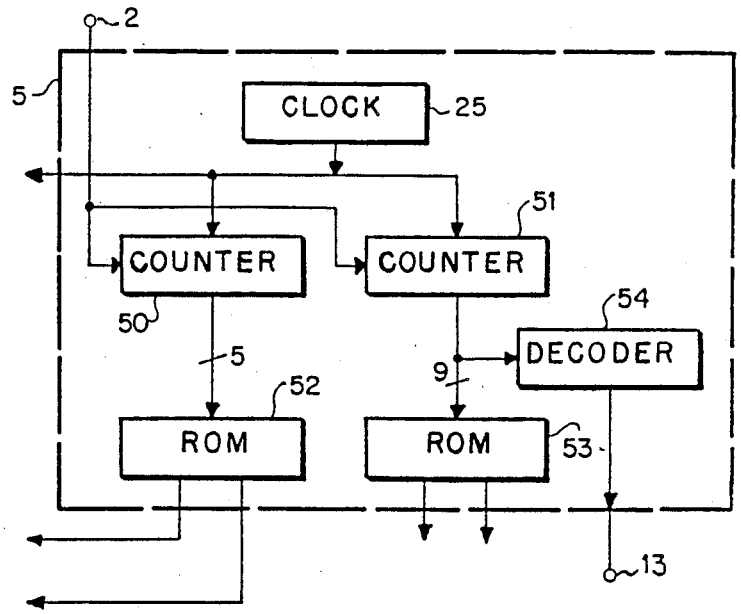
FIG_10
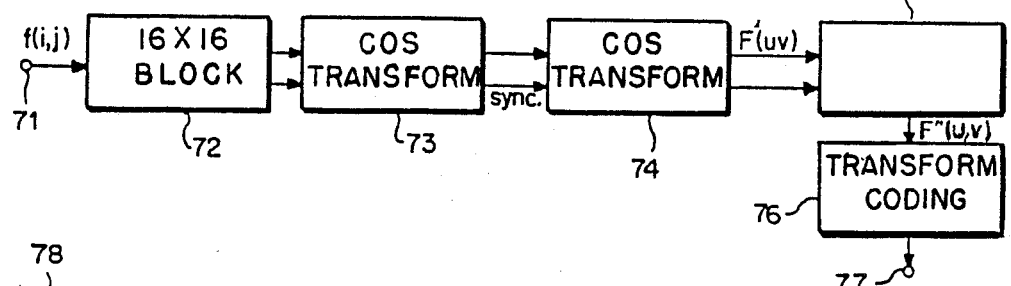
FIG_11
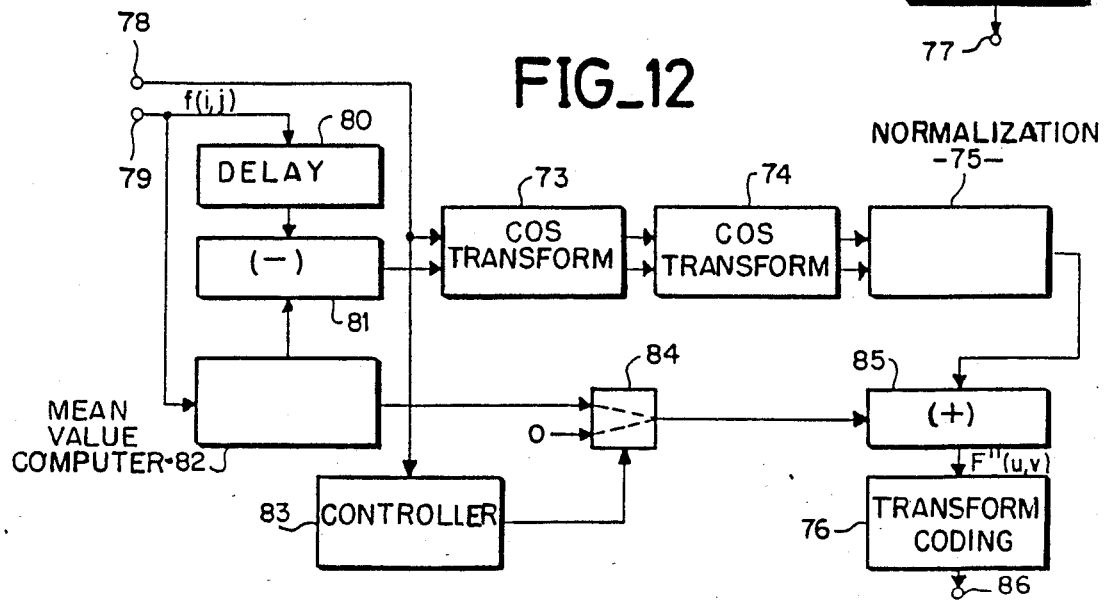
FIG_12

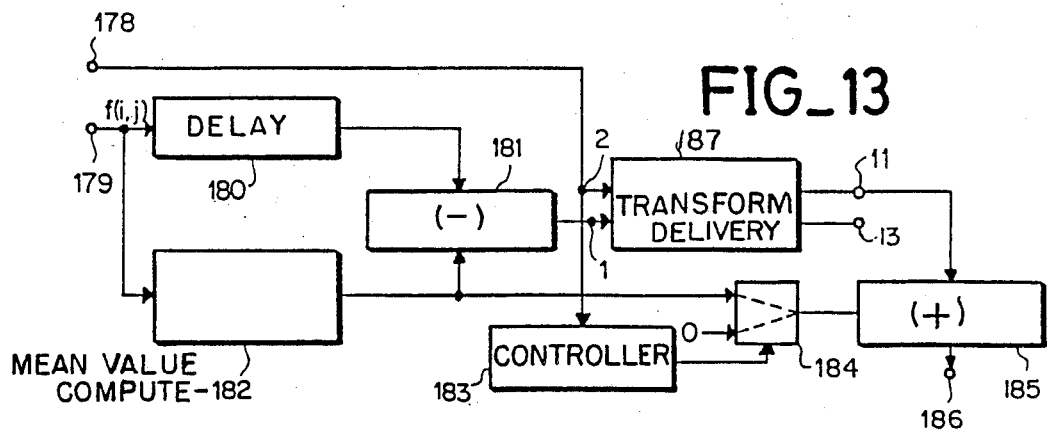
FIG_13
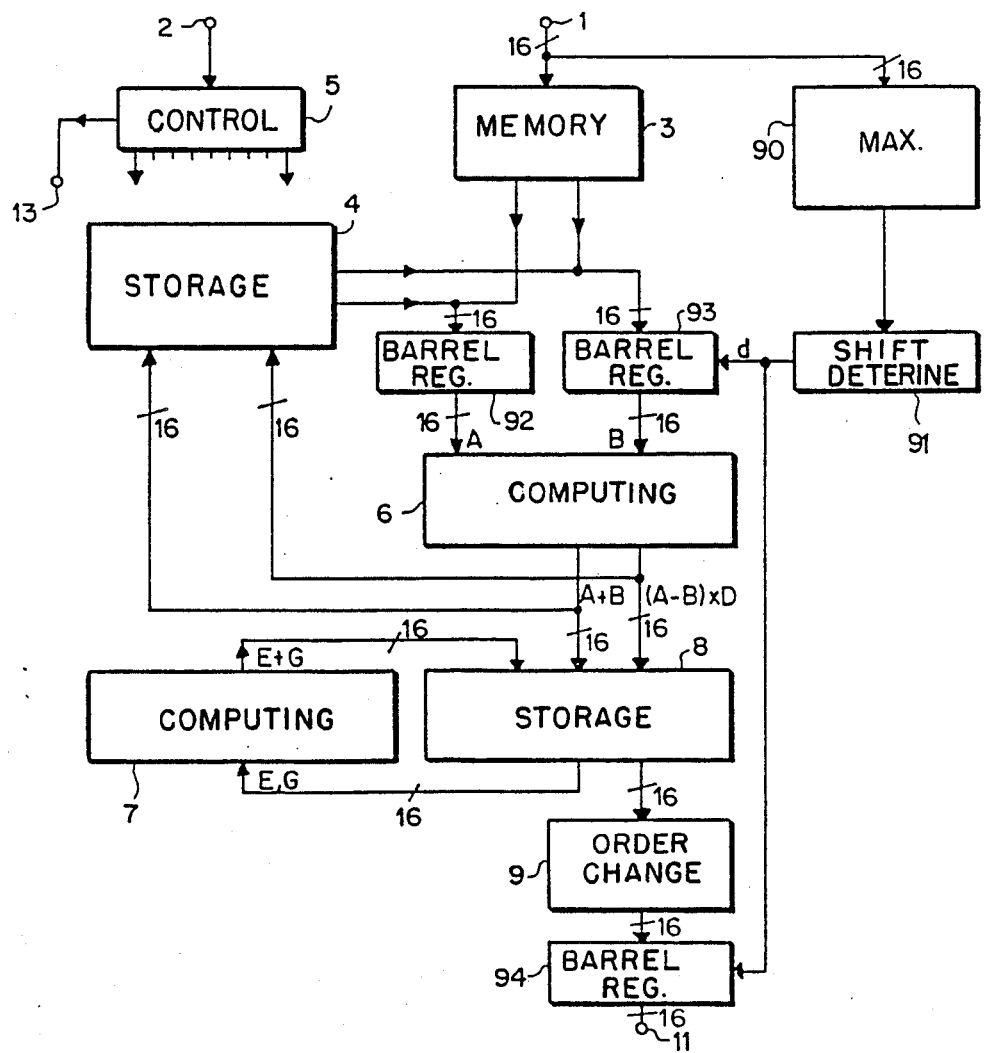
FIG_14

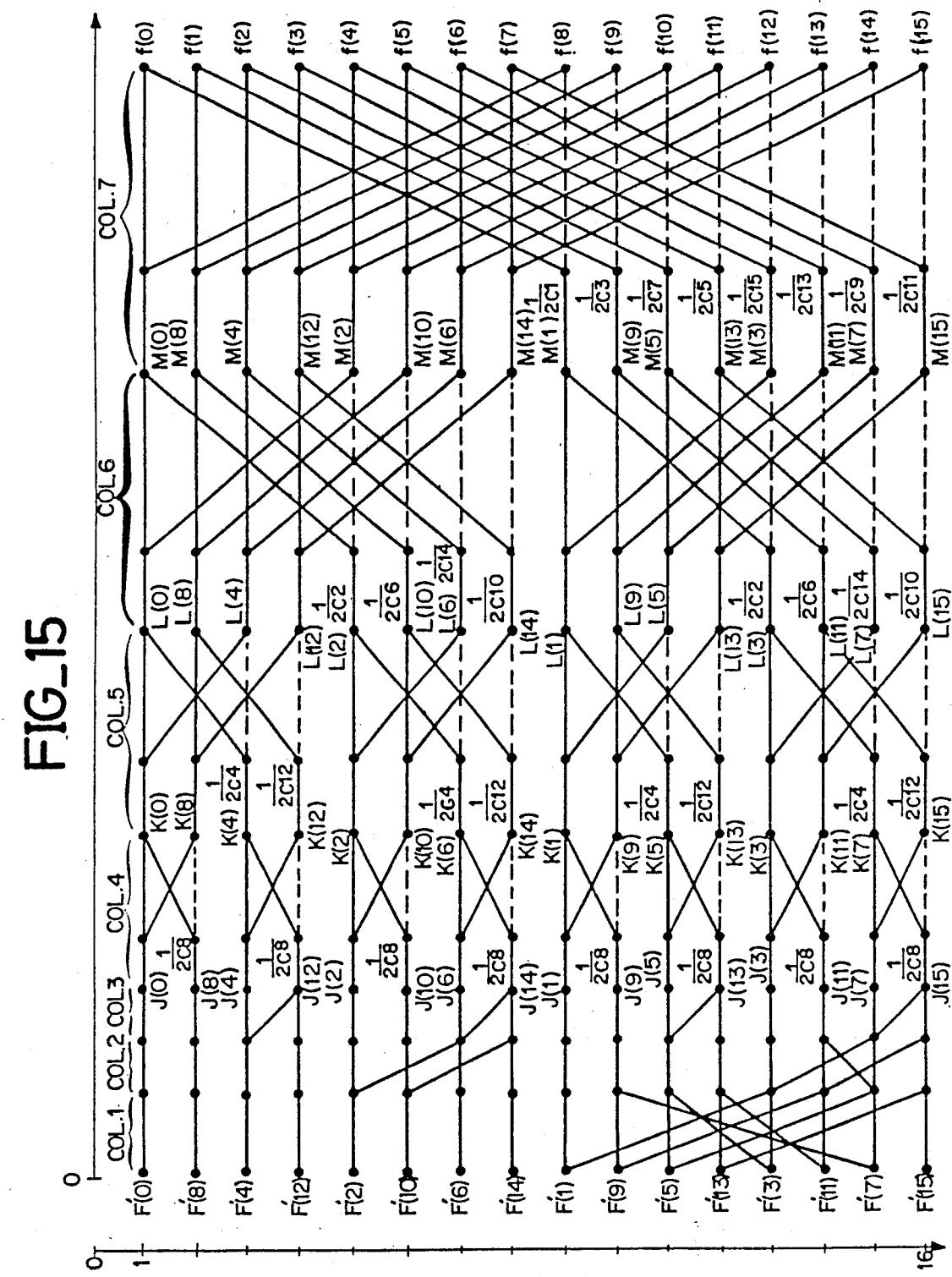
FIG_15

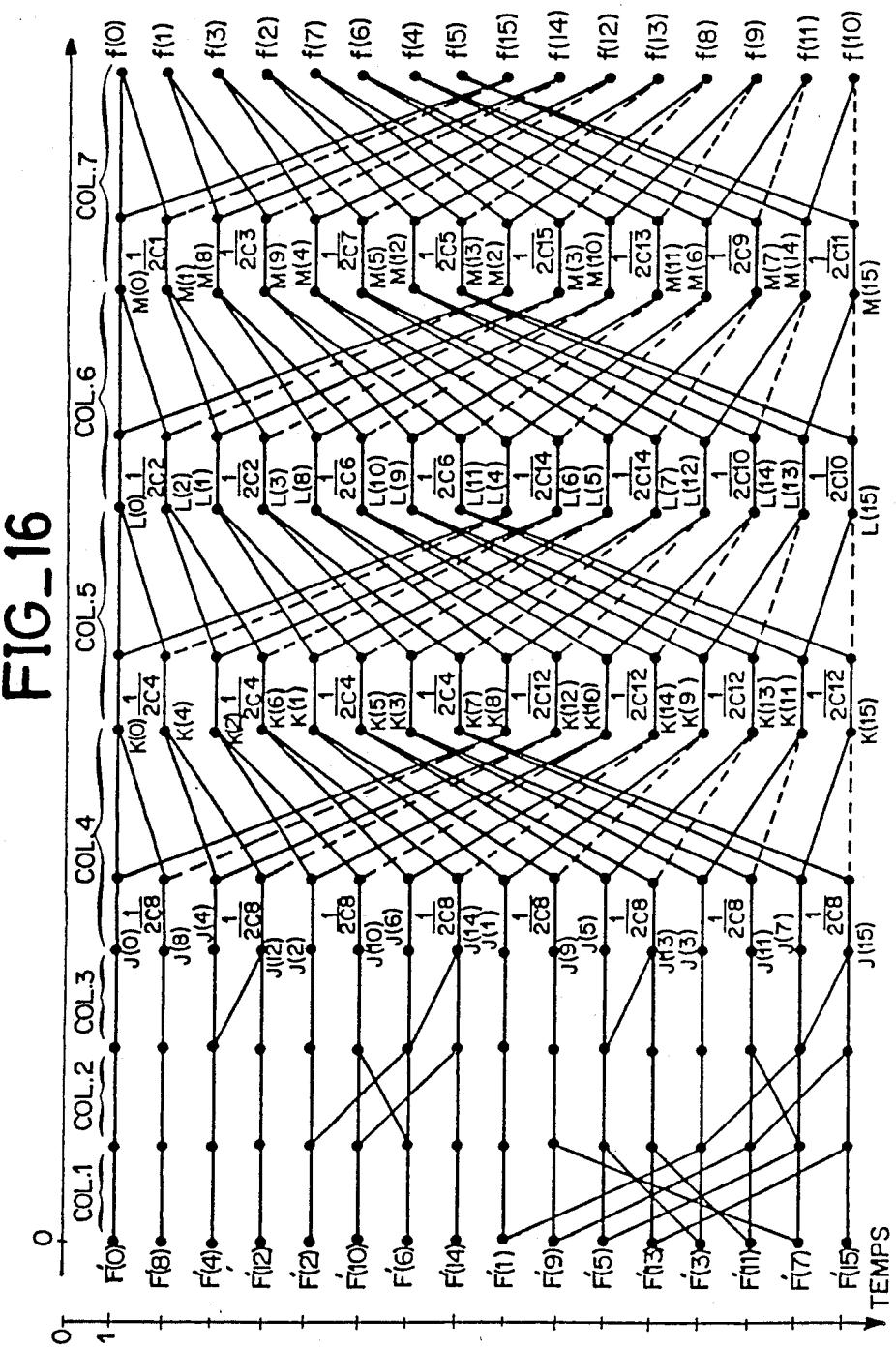
FIG_16

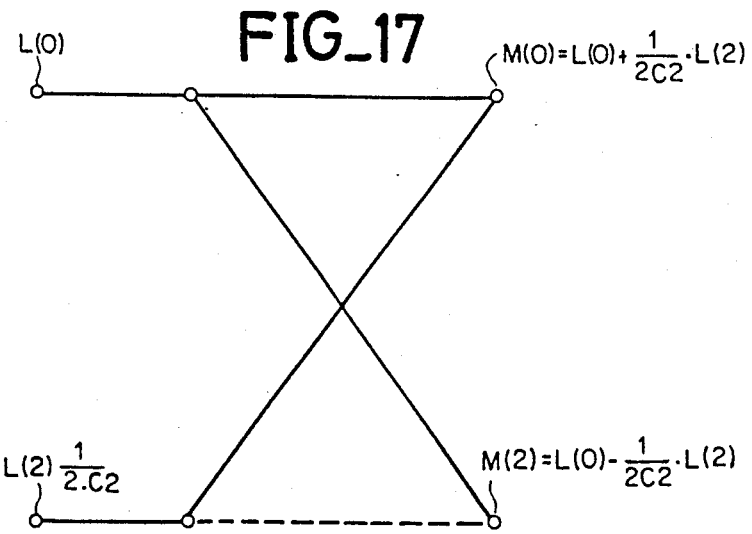
FIG_17
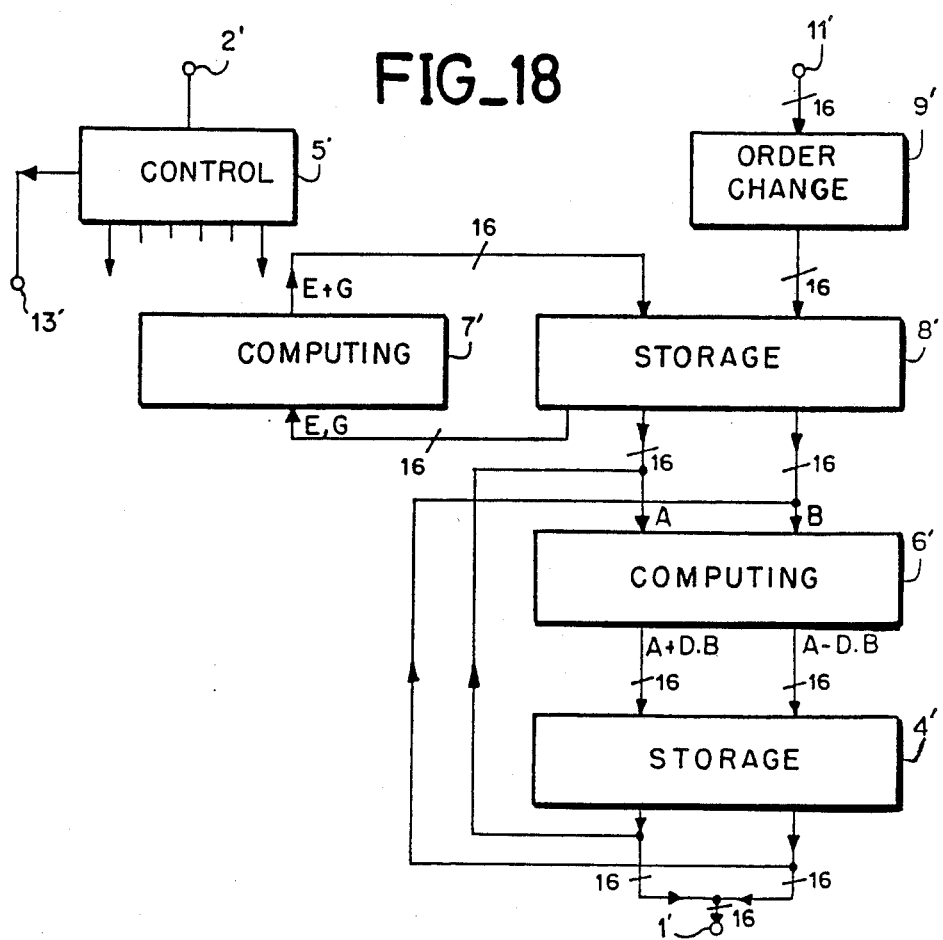
FIG_18

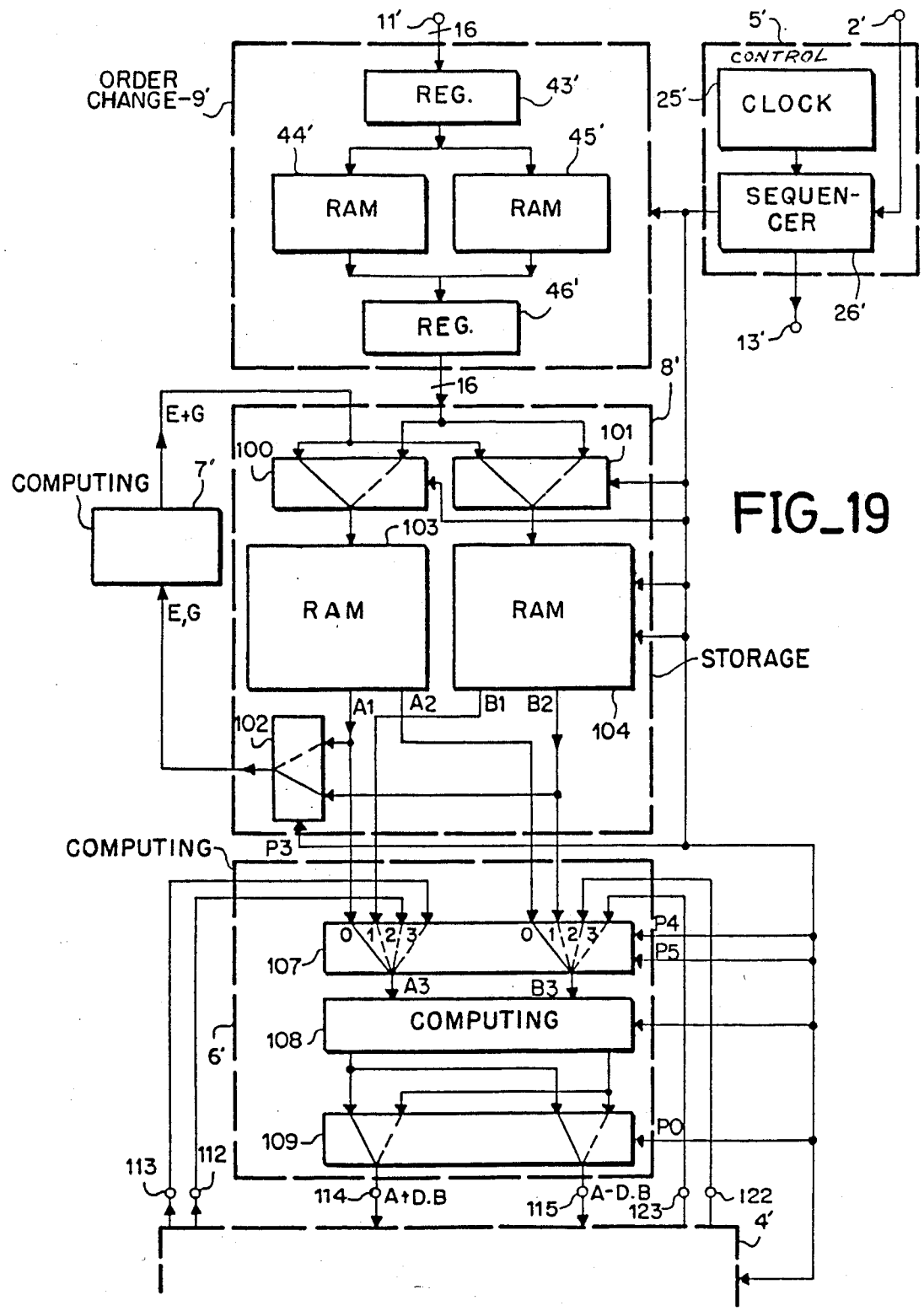
FIG_19

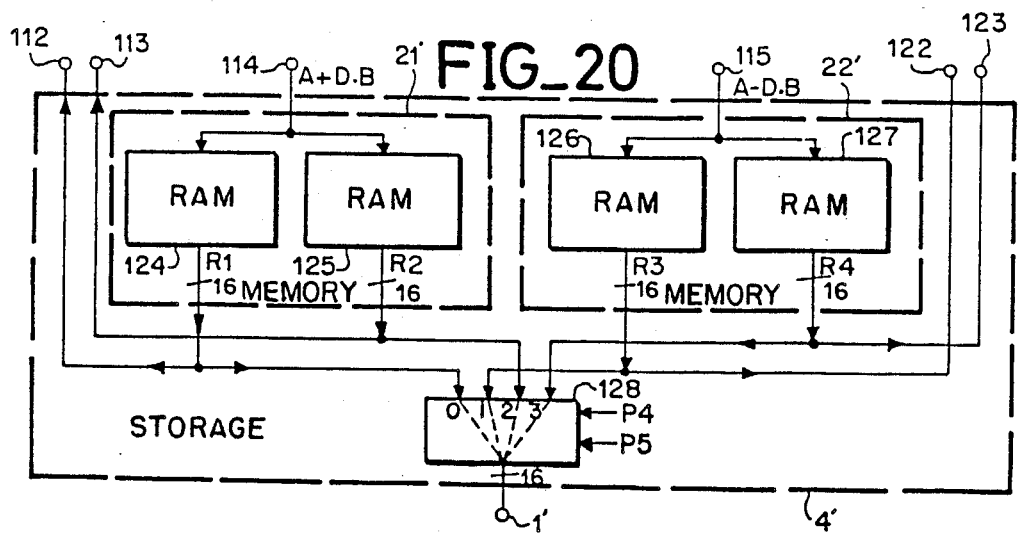
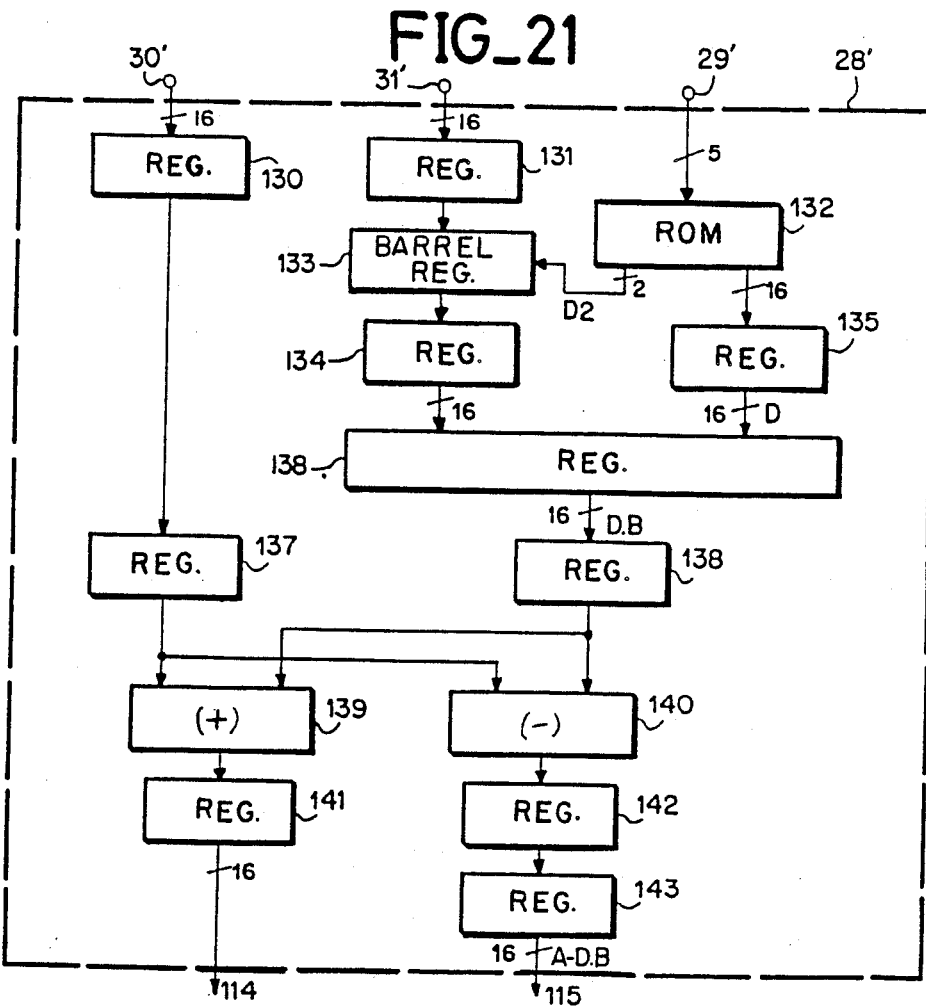

FIG_22
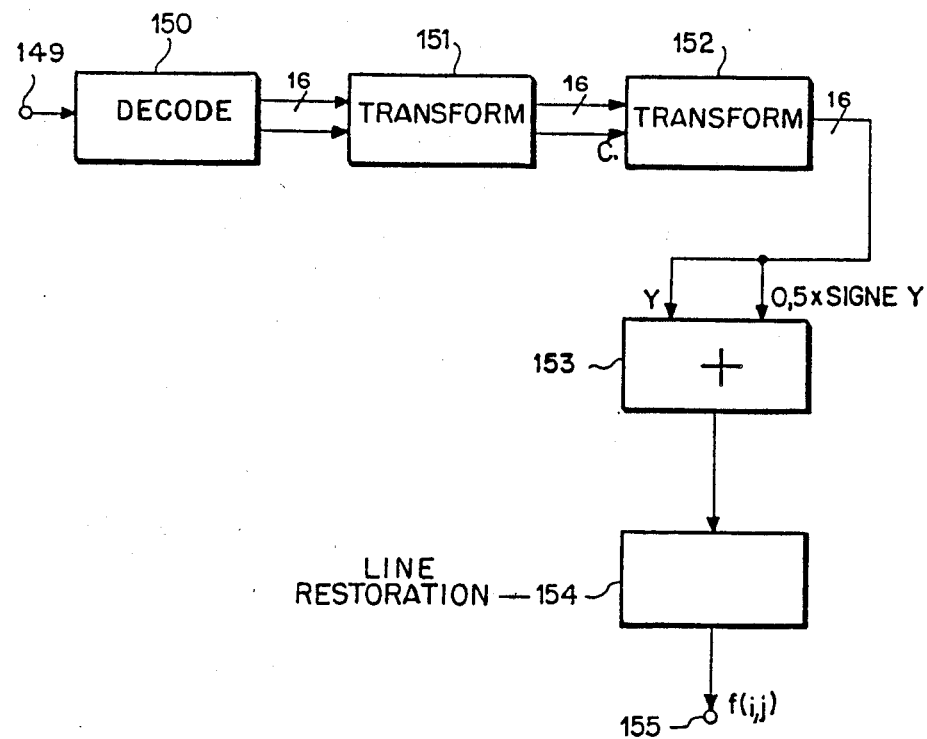

MONO-DIMENSIONAL REVERSE COSINE TRANSFORM COMPUTING DEVICE

CROSS-REFERENCE TO RELATED APPLICATION

This case is related to copending application Ser. No. 06/860,009.

BACKGROUND OF THE INVENTION

The invention relates to devices for computing cosine transforms, which are used more particularly for image coding so as to reduce the amount of information representing these images. Such information reduction allows images to be transmitted or stored using means having a limited information rate.

It is known to code values representative of the luminance and of the color of the pixels of an image by a transformation called bi-dimensional cosine transformation which causes a matrix of $N \times N$ values, called direct cosine transforms, to correspond to a matrix of $N \times N$ values representative of a block of $N \times N$ pixels of the image to be coded. This image is generally divided up into square portions each formed of a block of $N \times N$ pixels. Weighting of the transformed values reduces the amount of information representative of an image. Decoding consists in applying reverse weighting then a reverse cosine transformation which causes a matrix of $N \times N$ reverse transform values to correspond to a matrix of $N \times N$ direct transforms. Like coding, decoding is carried out by blocks of $N \times N$ image pixels.

If the values representative of the pixels of a block are $f(i, j)$ for $i=0$ to $N-1$ and $j=0$ to $N-1$, the values of the bidimensional direct cosine transforms are given by the following formulae:
for $u=0$ to $N-1$
and $v=0$ to $N-1$ $$F(u,v) = 4 \frac{c(u) \cdot c(v)}{N^2} \cdot \sum_{i=0}^{N-1} \sum_{j=0}^{N-1} f(i,j) \cdot a_{iu} \cdot a_{jv} \quad (1)$$

with $c(u) = 1\sqrt{2}$ for $u=0$ and $c(v) = 1\sqrt{2}$ for $v=0$ and $c(u) = 1$ for $u=1$ and $c(v) = 1$ for $v=1,2,\ldots,N-1$ and with $$a_{iu} = \cos \frac{(2i+1) \cdot u \cdot \pi}{2N} \text{ and } a_{j,v} = \cos \frac{(2j+1) \cdot v \cdot \pi}{2N}$$

The reverse transformed values are given by the bi-dimensional reverse cosine transformation by applying the following formula:

$$f(i,j) = \sum_{u=0}^{N-1} \sum_{v=0}^{N-1} c(u) \cdot c(v) F \cdot (u,v) \cdot a_{iu} \cdot a_{jv} \quad (2)$$

This bi-dimensional cosine transformation may be broken down into two mono-dimensional cosine transformations and the bi-dimensional transforms may be computed using two mono-dimensional transform computing devices connected together in cascade.

The mono-dimensional cosine transformation is carried out in accordance with the following formulae: for $k=0,1,2,\ldots,N-1$ $$F(k) = \frac{2}{N} c(k) \cdot \sum_{i=0}^{N-1} a_{ik} \cdot f(i) \quad (3)$$

with
$c(k) = 1\sqrt{2}$ for $k=0$
$c(k) = 1$ for $k=1,2,\ldots,N-1$
and $$a_{ik} = \cos \frac{(2i+1) \cdot k \cdot \pi}{2N}$$

The mono-dimensional reverse cosine transformation is carried out using the following formulae:

$$\text{for } i = 0 \text{ to } N-1 \; f(i) = \sum_{k=0}^{N-1} b_{ik} \cdot F(k) \quad (4)$$

with $b_{ik} = c(k) \cdot \cos \frac{(2i+1) \cdot k \cdot \pi}{2N} = c(k) \cdot a_{ik}$ The coding of an image by cosine transformation followed by weighting, greatly reduces the amount of information to be transmitted but has the drawback of requiring very numerous computations. This amount of computations is costly in equipment and in computation time. It makes it very difficult to apply the cosine transformation to coding and decoding a succession of video images at the usual frequency, 50 frames per second in the European standards.

High speed algorithms are known for carrying out a cosine transformation with a relatively reduced number of elementary multiplications and additions, particularly the algorithm of Chen et al which is described more particularly by R. A. Duryea in the article entitled "Performance of a source/channel encoded imagery transmission system" Thesis AFIT/GE/EE/79D-12, Air Force Institute of Technology, OHIO December 1979. It is derived from the above formula (3) using the mathematical relationships existing between the coefficients $a_{ik}$. With this algorithm, a mono-dimensional cosine transformation of the numerical values representative of 16 pixels may be carried out using 44 multiplications and 74 additions. It has been used in mono-dimensional cosine transform computing devices but this algorithm has the drawback of having an irregular structure resulting in a certain complexity of the implementation device.

The aim of the invention is to provide, for a low cost, a device for computing mono-dimensional direct cosine transforms and a device for computing mono-dimensional reverse cosine transforms having a simpler structure than the devices using the algorithm of Chen et al, for transforming successions of 16 values. The aim of the present invention is also to provide a coding device and a decoding device applying in real time the bi-dimensional cosine transformation to video images complying with conventional television standards.

The invention provides particularly a device for computing mono-dimensional direct cosine transforms and a device for computing mono-dimensional reverse cosine transforms, using two algorithms derived from known algorithms, described by Beyeong Gi Lee in "A new algorithm to compute the discrete cosine transform"—IEEE Trans. on Acoustic, Speech and Signal Processing. Vol. ASSP-32, n.6, pp1243–1245, December 1984. These algorithms of Beyeong Gi Lee are modified so that they can be used by transform computation devices formed essentially of a small number of ROMs and a small number of elementary computation devices formed by commercially available integrated circuits, and able to operate at a rate equal to the rate of analysis of the pixels in conventional television standards.

The invention also provides a device for coding and a device for decoding images by bi-dimensional cosine transformation, including two mono-dimensional cosine transform computing devices.

SUMMARY OF THE INVENTION

In accordance with the invention a mono-dimensional direct cosine transform computing device for transforming successions of 16 values includes:

an input memory for storing a succession of 16 values to be transformed;

first computing means for computing two values of the form A+B and (A−B)×D, where A and B are two operands applied respectively to two inputs and where D is a predetermined and positive coefficient;

first means for storing intermediate values, coupled to the first computing means, for delivering thereto, as operands, values which they have previously calculated;

second computing means for calculating a value of the form E+G, where E and G are two operands applied consecutively to an input of these second computing means;

second means for storing intermediate values, coupled to the second computing means for delivering thereto, as operands, values which they have calculated previously, and coupled to an output terminal of the transform computation device, for delivering thereto a succession of 16 transformed values;

control means controlling the input memory, the first and second intermediate value storage means, the first and second computing means, by means of control signals having a rate twice that of the values to be transformed and having a period corresponding to a succession of 16 values to be transformed, and by means of a clock signal having a rate double that of the values to be transformed.

In accordance with the invention a device for computing mono-dimensional reverse cosine transforms, for transforming a succession of 16 direct transformed values, includes:

first computing means supplying a value of the form E+G, where E and G are two operands applied consecutively to an input of these first computing means;

first means for storing intermediate values, coupled to an input and to an output of the first computing means for delivering thereto as operands, values which they have calculated previously, and coupled to an input terminal receiving the values to be transformed;

second computing means for calculating two values of the form A+D.B and A−D.B, where A and B are two operands respectively applied to two inputs of these second computing means and where D is a predetermined coefficient;

second means for storing intermediate values, coupled to the second computing means for delivering thereto as operands, values which they have calculated previously, and coupled to an output terminal of the reverse transform computing device for delivering to this output terminal a succession of 16 reverse transformed values;

control means controlling the first and second intermediate value storage means and the first and second computing means using control signals having a rate twice that of the values to be transformed and having a period corresponding to a succession of 16 values to be transformed, and by means of a clock signal having a rate twice that of the values to be transformed.

BRIEF DESCRIPTION OF THE DRAWINGS

FIG. 1 shows a diagram for computing mono-dimensional direct cosine transforms for a succession of 16 values, using the algorithm of Beyeong Gi Lee;

FIGS. 2 and 3 show elementary operations which are extracted from the diagram of FIG. 1;

FIG. 4 shows a diagram for computing mono-dimensional direct cosine transforms for a succession of 16 values, using the modified algorithm of Beyeong Gi Lee;

FIG. 5 shows a block diagram of one example of constructing a mono-dimensional direct cosine transform computing device for blocks of 16 values, in accordance with the invention;

FIG. 6 shows a diagram illustrating the operation of a part of this embodiment;

FIG. 7 shows a more detailed block diagram of this embodiment;

FIGS. 8, 9 and 10 show more detailed block diagrams of certain parts of this embodiment;

FIG. 11 shows the block diagram of one embodiment, of an image coding device including two mono-dimensional cosine transform computing devices of the invention;

FIG. 12 shows the block diagram of one embodiment of a variant of this image coding device;

FIGS. 13 and 14 show the block diagram of embodiments of two variants of the mono-dimensional direct cosine transform computing device for blocks of 16 values, in accordance with the invention;

FIG. 15 shows a mono-dimensional reverse cosine transform computing diagram for a succession of 16 values, using the algorithm of Beyeong Gi Lee;

FIG. 16 shows a diagram for computing reverse mono-dimensional cosine transforms for a succession of 16 values, in accordance with the modified algorithm of Beyeong Gi Lee,;

FIG. 17 shows an elementary operation taken from the diagram of FIG. 15;

FIG. 18 shows the block diagram of one embodiment of a mono-dimensional reverse cosine transform computing device for blocks of 16 values, in accordance with the invention;

FIGS. 19 to 21 show more details of block diagrams of certain parts of this embodiment;

FIG. 22 shows the block diagram of one embodiment of an image decoding device including two mono-dimensional cosine transform computing devices of the invention.

DESCRIPTION OF A PREFERRED EMBODIMENT

FIG. 1 shows the distribution in time of all the computing operations carried out using the algorithm of Beyeong Gi Lee. These computing operations supply 16 values $F'(0)$, $F'(1)$, ..., $F'(15)$ which are equal, within a factor, to 16 transformed values $F(0)$, $F(0)$, $F(1)$, ..., $F(15)$ of 16 values to be transformed: $f(0)$, $f(15)$, $f(7)$, $f(8)$, $f(3)$, $f(12)$, $f(4)$, $f(11)$, $f(1)$, $f(14)$, $f(6)$, $f(9)$, $f(2)$, $f(13)$, $f(5)$, $f(10)$. This computing diagram applies formula (3) without taking into account the factors 2.c(k), therefore:

$$F'(k) = \frac{N}{2 \cdot c(k)} \times F(k)$$

It will become clearer hereafter that the construction of a coding device by bi-dimensional transformation is simpler if these constant factors are not used during the computation but only at the end of the transform computation.

The factors $$\frac{N}{2 \cdot c(k)}$$

are constants which will be taken into account in a subsequent step of the computation. Hereafter, we will call transformed values the values F'(0), ... F'(15) supplied by application of this computing diagram, although they differ from the theoretical values F(0), ... F(15) given by formula (3).

This diagram includes two time axes: a horizontal axis oriented from left to right and a vertical axis oriented from top to bottom which define the order of the operations. The 16 values to be transformed f(0), f(15), ... f(10) are successively available. If, for example, they represent the luminance of a linear block of 16 pixels, they are available at the sampling rate of these pixels. These values are obtained in the order f(0), f(1), ... f(15) during sampling. They are then put into the order f(0), f(15), f(7), ... f(10) so as to be able to apply the algorithm. Each value to be transformed, each intermediate value and each transformed value is represented by a dot. The operations for obtaining the intermediate values and the transformed values are represented by continuous lines or broken lines. The convergence of two continuous lines symbolizes an addition. The convergence of a continuous line and a discontinuous line symbolizes a subtraction. A horizontal line with a numerical value above symbolizes a multiplication by this numerical value, the absence of a numerical value symbolizing transmission with a coefficient 1.

FIGS. 2 and 3 are extracts from FIG. 1, giving examples of operations symbolized in the FIG. 1. FIG. 2 shows an extract from the first computing line, corresponding to the value to be transformed f(0), and from the ninth computing line corresponding to the value to be transformed f(15). On the line corresponding to f(0), the first intermediate value is equal to the sum of f(0) and of f(15) for the dot representing this first intermediate value is connected by a continuous line to the point representing the value to be transformed f(0) and by a continuous line to the value representing f(15). The second intermediate value is also equal to f(0)+f(15) for it is connected by a continuous line, over which there is no numerical value, to the first intermediate value.

On the computation line corresponding to f(15), the first intermediate value is equal to f(0)−f(15) for the dot representing it is connected by a broken line to the dot representing the value to be transformed f(15), and by a continuous line to the value to be transformed f(0). The second intermediate value on the line corresponding to f(15) is equal to (f(0)−f(15))

$$\times \frac{1}{2C_1}$$

for it is connected by a continuous line, over which is shown the value $$\frac{1}{2C_1},$$

to the point representing the second intermediate value, on the line corresponding to f(15).

FIG. 3 shows an extract from FIG. 1 corresponding to a part of the computing lines delivering the transformed values F'(4) and F'(12). Only the last three intermediate values of these lines have been shown. The computations are considered from a first intermediate value g1 and a first intermediate value g2 respectively. On the line corresponding to F'(4) the second intermediate value is equal to g1+g2 for it is connected by continuous lines to the intermediate values g1 and g2. The third intermediate value and the transformed value F'(4) are equal to g1+g2 for the computation is simply reduced to transmission of the second intermediate value, without delay. On the line corresponding to F'(12), the second intermediate value, the third intermediate value and the transformed value F'(12) are equal to g2 for the computations are reduced to transmission without delay.

The whole of the computation shown in FIG. 1 may be carried out by 32 multiplications and 81 additions. In the diagram of FIG. 1, the columns of values separate columns of operations. An examination of this diagram shows that the succession of operations within a column is different in each of the operation columns. The use of this algorithm requires then a different sequence of operations in each of the operation columns, which complicates the construction of the implementation device.

In order to simplify the construction of the implementation device, the algorithm of Beyeong Gi Lee is modified as shown in FIG. 4. The order of the values to be transformed is modified: f(0), f(15), f(7), f(8), f(3), f(12), f(4), f(11), f(1), f(14), f(6), f(9), f(2), f(13), f(5), f(10). The lines of dots representing the intermediate values are permuted in the same way as the values to be transformed. The connections between the dots representing the values to be transformed, the intermediate values and the transformed values are maintained during these permutations as if the lines representing these connections were elastic threads.

The order of the transformed values obtained is therefore modified also: F'(0), F'(1), F'(2), F'(3), ... F'(15). It should be noted that the values to be transformed are no longer in the order of increasing indices but, on the contrary, the transformed values are now in the order of increasing indices. The most remarkable property of this modified diagram is that it includes four computation columns COL 1, COL 2, COL 3, COL 4, which are identical. Furthermore, each of these computation columns is formed of eight operations such as that shown in FIG. 2. Each of these eight operations allows a value to be obtained of the form of A+B and a value of the form (A−B)×D from a first operand of value A, a second operand of value B and a third operand of value D which is a predetermined constant.

With the very repetitive structure of this modified computation diagram 64 intermediate values may then be obtained corresponding to the four identical operation columns, COL 1 to COL 4, using a single computing device having a first and a second operand input receiving two values A and B respectively, with a third operand input receiving a value D and two outputs delivering respectively two values A+B and (A−B)×D. If such a computing device delivers pairs of values at a rate twice the rate at which the values to be transformed are available, then with a single computing device 64 intermediate values may be obtained during the time corresponding to 16 values to be transformed. The result is then a very simple structure of the transform computing device.

The three operations columns situated at the right of the computing diagram of FIG. 4 include in all 17 additions. Some values supplied by the first four operations columns are transmitted without modification and with delay to form transformed values. This is the case of the transformed values: F'(0), F'(2), F'(12), F'(14), F'(15).

Furthermore, it should be noted that the other transformed values resulting from several additions situated in the last three operations columns may be considered as resulting from chain additions, that is to say that the diagram for computing such a transformed value includes a horizontal line, indicating the transmission of an intermediate value previously obtained on the same line, and an oblique line indicating the addition of another intermediate value obtained on another line.

For example, the transformed value F'(3) is obtained from an intermediate value calculated on the fourth line of the diagram, which line corresponds to F'(4), to which is added first of all an intermediate value calculated on the line corresponding to F'(7), then to which is added an intermediate value calculated on the line corresponding to the transformed value F'(5), with these chain addition operations an intermediate value or a transformed value may be obtained by supplying for each addition a single operand to an adder, as soon as the addition chain has been initialized, which is faster and simpler to carry out than to supply two operands to an adder. For example, for performing an addition chain such as G+H+I+J, the first addition G+H requires two computing periods for loading consecutively the values G and H, but all the other additions only require a simple computing period for loading a new operand.

This second feature of the structure of the computing diagram also simplifies the device for implementing the algorithm. If a computing device performs chain additions at a rate equal to twice that at which the values to be transformed are available, it may easily perform the 17 additions shown in the diagram and output the 16 transformed values, during the time corresponding to 16 values to be transformed. Such a computing device performing chain additions will then be sufficient.

Apart from the computing device performing operations of the type shown in FIG. 2 and the device for computing chain additions, it is necessary to provide memories for storing the intermediate values which form alternately the results delivered by the computing devices and the values of the operands applied to these computing devices.

FIG. 5 shows a block diagram of one embodiment of a mono-dimensional direct cosine transform computing device of the invention. This example includes: an input terminal 1 receiving successions of 16 numerical values which may be values representative of a linear block of 16 pixels or 16 mono-dimensional direct cosine transformed values delivered by another mono-dimensional direct cosine transform computing device, two devices of the invention being associated in series so as to form a bi-dimensional direct cosine transform computing device; an input terminal 2 receiving a synchronization signal; an input memory 3; control means 5; first and second intermediate value storage means 4 and 8; first and second computing means 6 and 7, an order changing device 9; an output terminal 11 delivering successions of 16 transformed values calculated in accordance with a computing diagram of FIG. 14; and an output terminal 13 delivering a synchronization signal.

The input memory 3 has a data input connected to the input terminal 1 for receiving each value to be transformed, in the form of a binary word of 16 bits, and has two outputs connected respectively to a first operand input and to a second operand input of the first computing means 6 for supplying thereto respectively two binary words of 16 bits. The first means 4 for storing the intermediate values have a first and second output connected in parallel to the outputs of the input memory 3 to the first and second operand inputs of the computing means 6. The outputs of first means 4 and of memory 3 may assume three states, including a high impedance state for avoiding conflicts between these outputs.

The computing means 6 have a first output connected to a first data input of first means 4 and to a first data input of seconds means 8 and delivering a binary word of 16 bits. The computing means also have a second output connected to a second data input of first means 4 and to a second data input of second means 8 and supplying thereto a binary word of 16 bits. Second means 8 includes: a third data input connected to an output of the second computing means 7 for receiving a binary word of 16 bits; a first output connected to an operand input of the computing means 7 for supplying thereto a binary word of 16 bits; and a second output connected to an input of the order change device 9 for supplying thereto a binary word of 16 bits. Device 9 has an output connected to the output terminal 11 of the example shown, for supplying thereto a binary word of 16 bits forming a transformed value.

The control means 5 are connected to the input terminal for receiving the synchronization signal. In this example, with the device intended to form part of a coding device by bi-dimensional cosine transformation, the synchronization signal corresponds to 16 successions of 16 values to be transformed, that is to say a block of 16×16 pixels. Means 5 have an output connected to the output terminal 13 for delivering a synchronization signal corresponding to 16 successions of 16 transformed values supplied by the output terminal 11. This synchronization signal allows a second monodimensional direct cosine transform computing device or else a transformed value coding and transmission device to be synchronized.

The control means 5 also have other outputs, connected by connections, not shown, to control inputs of the input memory 3, of the intermediate value storage means 4 and 8, of the computing means 6 and 7, and of the order change device 9. They deliver a clock signal whose rate is twice the rate at which the values to be transformed are applied to the intput terminal 1. They deliver control signals in accordance with the cycle whose duration is equal to 13 clock periods and corresponds to 16 values to be transformed, for controlling the computing means 6 and 7, the storage means 4 and 8, and the input memory 3; and they deliver control signals for controlling device 9, in accordance with a cycle whose duration is 512 clock periods, which corresponds to 16×16 values to be transformed.

The purpose of the input memory 3 is to store the values to be transformed one by one and to restore them two by two for forming the two operands used by the first computing means 6 for carrying out the operations shown in the first column COL 1 of the computing diagram of FIG. 4. The values to be transformed are applied in the order shown in the diagram of FIG. 4: f(0), f(15), f(7), f(8), ... f(10), which is not the order of analysing the corresponding pixels. The sampling and digitization means and the means for changing the order of values f(0), f(1), ... f(15) have not been shown. They come within the field of conventional technique.

The purpose of first means 4 is to store the intermediate values supplied by the outputs of the computing means 6 two by two then to deliver them to the two operand inputs of computing means 6 for performing the operation shown in the second column COL 2, the third column COL 3 and the fourth column COL 4, of the operations shown in FIG. 4. Computing means 6 deliver respectively at their two outputs values of the form A+B and (A−B)×D when two values of the form A and B have been applied respectively to their two operand inputs. The value D of the third operand is a constant selected by a control signal delivered by means 5.

The purpose of second means 8 is to store the pairs of intermediate values supplied by the two outputs of computing means 6 then to supply these values individually either to the input of computing means 7 or to the input of the order change device 9. Means 8 also store intermediate values supplied by the computing means 7 to the third data input of means 8.

The order changer device 9 performs an order change of the transformed values supplied by the second output of the intermediate value storage means 8. The order change depends on the subsequent use of the transformed values. Device 9 stores sixteen successions of 16 transformed values which are computed line after line in accordance with the following table:

| line | column no 0 | 1 | 2 | ... | j | ... | 15 |
|---|---|---|---|---|---|---|---|
| n° 0 | $F'^0(0)$, | $F'^0(1)$, | $F'^0(2)$, | ... | ... | ... | $F'^0(15)$ |
| 1 | $F'^1(0)$, | ... | ... | | | | $F'^1(15)$ |
| 2 | $F'^2(0)$, | | | | ... | | $F'^2(15)$ |
| 3 | $F'^3(0)$, | | | | ... | | $F'^3(15)$ |
| . | ... | | | | ... | | ... |
| i | ... | ... | ... | ... | $F'^i(j)$ | ... | ... |
| . | | | | | | | |

If the transformed values are applied to a second mono-dimensional direct cosine transform computing device, for obtaining bi-dimensional direct cosine transforms, the order changer has two aims:

to read out the values from this table, column by column, and to read out the values of each column in the order expected by the second computing device, that is to say the order of the values to be transformed shown in the diagram of FIG. 4: $F'^0(0)$, $F'^{15}(0)$, $F'^7(0)$, $F'^8(0)$, ..., $F'^{10}(0)$, then $F'^0(1)$, $F'^{15}(1)$, ..., $F'^{10}(1)$, then $F'^0(2)$, ... etc. The second transform computing device has then a memory identical to the input memory 3.

In the case where this embodiment forms the second mono-dimensional cosine transform computing device, its output terminal 11 delivers transformed values F'(u,v) in an order adapted for the subsequent processing, generally for reducing the amount of information representing an image. This adapted order is generally the order defined by FIG. 6 and which is called zig-zag order. This order corresponds to classification of the transformed values in increasing values of u and v, which corresponds to statistically decreasing absolute values for the transformed values.

The choice of the format of the values is particularly important for forming the device of the invention. Computing means 6 and 8 work on values having a predetermined format: 13 bits for the whole part and 3 bits for the decimal part. This format was determined by calculating a majorant for each of the intermediate values and for each of the transformed values met in the diagram of FIG. 4, as a function of the majorant of the values to be transformed. When these latter are formed by luminance values, they are coded over 8 bits and are included between 0 and +255. The intermediate values and the transformed values have then for majorants +4080 and −2778. To avoid any overflow of the format, these majorant values lead to choosing a 13 bit format for the whole part, including a bit dedicated to the sign. Since, on the other hand, the commercially available multiplying circuits currently process 16 bit values, a 3 bit format for the decimal part was chosen.

A bi-dimensional cosine transform computing device includes, in series, two mono-dimensional transform computing devices. A first device receives values to be transformed which are luminance values between 0 and +255 and which are represented by 8 bits. To avoid any overflow of the format during computation, these 8 bits form the 8 least significant bits among the 13 bits reserved for the whole part of the values applied to the input terminal 1.

A second device, identical to the first one, except for the operation of the order changer device 9, receives values to be transformed which are formed by the mono-dimensional cosine transforms F'(u), for u=1 to 15, supplied by the output terminal 11 of the first device. These values F'(u) have the predetermined format, including 13 bits for the whole part, including the sign bit, and three bits for the decimal part. F'(o) is between 0 and +4080 and F'(u) for u=1 to 15 is between −1442 and +1442, without taking into account the coefficients $$\frac{2}{N} c(k).$$

These values are not in the range 0, +255 considered above for determining the format of the values in the whole of the first mono-dimensional transform computing device. It is possible to bring these values within this range by means of a division by 16. The value F'(u) divided by 16 is then in the range 0, +255 and the value F'(u) for u=1 to 15 is between −127 and +127, which is equivalent for the format, for 8 bits are then sufficient in both cases. The values delivered by the first device may then be brought into a range 0, +255 or −127, +127, so as to avoid any overflow of the intermediate values or of the transformed values, by means of a rightward shift of 4 bits. The decimal point remains in front of the 3 bits of the decimal part.

Furthermore, the above defined format of the values to be transformed for the first mono-dimensional cosine transform computing device does not include a decimal part, in other words the decimal point is fixed at the right of the least significant bit. When a value F'(u) including 3 decimal value bits is applied to this input, everything happens as if its decimal point were shifted 3 bits to the right, in other words the value is multiplied by 8.

Taking into account these two remarks, the change of format between the two mono-dimensional transform computing devices, causes then a division by 2 of the transmitted value. This division by 2 will be compensated for by the normalization operation, at the same time as the coefficients $$\frac{2.c(k)}{N}$$

will be taken into consideration. This normalization operation is performed after the second mono-dimensional direct transformation.

Thus, in both mono-dimensional transform computing devices, the computations are performed with the same fixed format. These computations give less accurate results than computations with a floating decimal point, but they may be performed using circuits which are much simpler, more rapid, less expensive and easier to integrate.

FIG. 7 shows a more detailed block diagram of the embodiment shown in FIG. 5. The control means 5 are formed by a clock 25 of frequency 22.5 MHz and a sequencer 26. In this example, an image is sampled at a frequency of 13.5 MHz but the values representative of the pixels of this image are delivered to the transform computing device at a frequency of 11.25 MHz for the suppression time between image lines is recovered. The frequency of clock 25 is twice the frequency at which the values to be transformed are applied to the input terminal 1. An output of clock 25 is connected to an input of the sequencer 26. The sequencer 26 delivers control signals to the whole of the transform computing device with a period equal to 32 periods of clock 25. It is synchronized by the synchronization signal applied to the input terminal 2 indicating the beginning of each block of 16 successions of 16 values to be transformed. An output of sequencer 26 delivers to the output terminal 13 a synchronization signal which may be used for synchronizing a second mono-dimensional direct cosine transform computing device. A multiple output of sequencer 26 supplies the control signals required by all the elements forming the transform computing device.

The input memory 3 is formed of a register 23 having a capacity of one word of 16 bits, and a RAM 24: having a data input port connected to an output of register 23, a first and second data output ports forming the two outputs of means 3, a double addressing port connected to the multiple output of the control means 5 and allowing the data leaving through the two output ports to be selected respectively, and control inputs connected to the multiple output of the control means 5 for controlling a reading or writing operation. Register 23 has a clock input connected to the multiple output of the control means 5 for receiving a control signal having a period equal to two clock periods.

Memory 24 is formed of four integrated circuits having the designation Am 29707 manufactured by the firm AMD. It allows simultaneous reading of two data selected respectively by the two addressing ports or it allows simultaneous reading and writing at two addresses selected respectively by the two addressing ports, or else it allows two reading operations respectively at the two addresses selected by the double addressing port and simultaneously a writing operation at an address selected by one of the addressing ports. This type of memory then allows simultaneous reading and writing at the samae address. It allows then a continuous flow of values to be transformed, applied to the input terminal 1, to be stored and restored simultaneously. Memory 24 stores 16 values to be transformed, at the rate at which they are available at the input terminal 1, during the time of 32 clock periods, and restores 8 values at each of the two output ports during the time of 8 clock periods.

These 8 pairs of values are used by computing means 6 for computing 16 first intermediate values, during 8 first clock periods. then, during the next 24 clock periods means 6 receive intermediate values supplied by the two outputs of the intermediate value storage means 4. During the first 8 clock periods, in each cycle of 32 clock periods memory 24 works simultaneously for reading and writing. During two successive clock periods, among these 8 first periods, a writing operation and a reading operation are performed during a clock period, at a first address, then a reading operation is performed at a second address during the next period. The order of reading the values in memory 24 is fixed by the computation algorithm, that is: f(0), f(15), f(7), f(8), f(3), ... f(10), as shown in FIG. 4. Since writing must be performed at the same address as reading, but at half the rate, the values to be transformed must then be applied to the input terminal 1 in the order: f(0), f(7), f(3), f(4), f(1), f(6), f(2), f(5) then f(15), f(8), f(12), f(11), f(14), f(5), f(13), f(10).

The intermediate value storage means 4 are formed by two distinct memories 21 and 22 storing separately the first operands and the second operands which are applied respectively to the first and to the second operand inputs of the computing means 6. Each of memories 21 and 22 is formed of four integrated circuits Am 29707 and may store 16 words of 16 bits. Each of these memories has a single data input port and a single output port. The data input ports of memories 21 and 22 form the two data inputs of means 4 and the output ports form the two data outputs of means 4. An addressing port of memory 21 and an addressing port of memory 22 are connected in parallel to the multiple output of the control means 5. Writing and reading control inputs for memories 21 and 22 are also connected to the multiple output of the control means 5.

Means 4 are formed of two distinct memories 21 and 22 because they must simultaneously store two values which are supplied simultaneously by the computing means 6 and deliver simultaneously two operand values to the computing means 6. It would be possible to use a single memory with a double input port and a double output port but a memory of this type has not sufficient speed in this application, in the present state of the technology.

The computing means 6 include a computation circuit 28 and two multiplexers 34 and 35 having two inputs and one output. The computing circuit 28 has two input terminals 30 and 31 forming the first and second operand inputs of means 6, a control input terminal 29 connected to the multiple output of the control means 5 and two output terminals 32 and 33. The output terminal 32 is connected to a first input of multiplexer 34 and to a first input of multiplexer 35. The output terminal 33 is connected to a second input of multiplexer 34 and to a second input of multiplexer 35. The output of multiplexer 34 and the output of multiplexer 35 form respectively the first and second outputs of means 6. Multiplexer 34 and multiplexer 35 have respectively two control inputs connected in parallel to the multiple output of the control means 5.

The computing circuit 28 delivers at its output terminals 32 and 33 respectively a first result of the form $A+B$ and a second result of the form $(A-B)\times D$ when a first operand of the form A and a second operand of form B are applied respectively to the input terminal 30 and to the input terminal 31. In the rest of the computation, a result delivered by terminal 32 is used either as first operand applied to the input terminal 30 after being restored by means 4 or as second operand applied to the input terminal 31 after being restored by means 4. In FIG. 4, it can be seen that the intermediate value situated on the first 8 lines in the first columns of the computation diagram are of type $A+B$ whereas the intermediate values situated on the last 8 lines are of type $(A-B)\times D$.

One intermediate value out of two forms then the first operand and one intermediate value out of two forms then a second operand for the computation circuit 28. Consequently, the results of the form $A+B$ must be stored alternately in memory 21 for the first operands and alternately in memory 22 for the second operands. Similarly, for the results of form $(A-B)\times D$, the control means 5 control then the multiplexers 34 and 35 so as to route the results supplied by the computation circuit 28 alternately to memory 21 and to memory 22. It should be noted that the multiplexers 34 and 35 would not be necessary if means 4 were formed of a single memory with double input port and double output port.

It should also be noted that in the computation diagram corresponding to the modified algorithm of Beyeong Gi Lee, shown in FIG. 4, the successive intermediate values from top to bottom are alternately of type A and B. The reading of 16 operands in means 4 is then well spread out during 8 clock periods. On the other hand, each operation performed by the computation circuit 28 delivers two results which are simultaneously future operands of type A or simultaneously future operands of type B. So as to avoid having to write simultaneously two results of type A in memory 21 and alternately two results of type B in memory 22, the computation circuit 28 delays by one clock period the result of type $A+B$ delivered by its output terminal 32 so as to perform successively the writing of the two results of the same type, delivered by each operation of the computation circuit 28.

The computation means 8 include: four multiplexers 36 to 39 each equivalent to a switch with one circuit and two positions; two RAMs 40 and 41 with double addressing port. A first input of multiplexer 36 and a first input of multiplexer 37 form respectively the first and second inputs of the computing means 8. A second input of multiplexer 36 and a second input of multiplexer 37 are connected together and form the third input of the computing means 8. An output of multiplexer 36 and an output of multiplexer 37 are connected respectively to a data input of memory 40 and to a data input of memory 41. An output of memory 40 is connected to a first input of multiplexer 38 and to a first input of multiplexer 39. An output of memory 41 is connected to a second input of multiplexer 38 and to a second input of multiplexer 39. An output of multiplexer 38 and an output of multiplexer 39 form respectively the first and second outputs of computing means 8.

Multiplexers 36 to 39 each have a control input connected to an output of the control means 5. Memories 40 and 41 each have two addressing ports and a reading and writing control input connected to an output of the control means 5. Each of these memories is formed of four integrated circuits of the Am 29707 type allowing 16 words of 16 bits to be stored. The presence of two memories 40 and 41 allows two values to be stored simultaneously which are applied simultaneously by the two outputs of the computing means 6. Thus it is possible to store 16 values in 8 clock periods. The two outputs of storage means 8 allow a value to be supplied to computing means 7 and simultaneously a value to be supplied to the order change device 9. Thus, device 9 may receive 16 transformed values while the computing means 7 may receive 16 intermediate values, necessary for computing 17 additions, during a cycle of 32 clock periods. The routing of the values received at the inputs of the storage means 8 and of the values to be fed to the outputs of storage means 8 is performed by means of a succession of control signals delivered by the control means 5 with a period corresponding to 32 clock periods.

The order change device 9 is formed of two registers 43 and 46 able to store a value of 16 bits, and two RAMs 44 and 45. Registers 43 and 46 form respectively an input buffer and an output buffer connected respectively to the data input of device 9 and to the output terminal 11. The output of register 43 is connected to a data input of memory 44 and to a data input of memory 45. An input of register 45 is connected both to an output of memory 44 and to an output of memory 45. Memory 44 and memory 45 each have an address input and reading and writing control inputs connected respectively to the multiple output of the control means 5 through connections not shown in FIG. 7. Memories 44 and 45 are each formed of four integrated circuits Cy 7C122 manufactured by Cypress and having a capacity of $256\times 4$ bits.

The transformed values are stored in device 9 as they become available, then they are restored by device 9 in a different order. The control means 5 deliver to the address inputs of memories 44 and 45 respectively two successions of address values corresponding to these two different orders. They deliver to one of the memories, 44 or 45, writing control signals and they deliver to the other memory reading control signals, alternately with a period corresponding to $16\times 16$ values. It should be noted that the transformed values are written at the rate at which they are avilable, that is to say at a rate equal to the clock rate, whereas they are restored at a rate equal to the rate at which the values to be transformed are applied to the input terminal 1, that is to say at a rate a half that of the clock used for the computations.

FIG. 8 shows a block diagram of one embodiment of the computation circuit 28. This computation circuit includes: 8 registers capable of storing a 16 bit word, 50, 51, 54, 55, 57, 59, 60, 62; an adder 52; a subtractor 53, a barrel register 58; a ROM 56; a multiplier 61. The input terminals 30 and 31 are connected respectively to an input of register 50 and to an input of register 51 for supplying thereto a first 16 bit word forming a first operand A and a second 16 bit word forming a second operand B. The output of register 50 is connected to a first input of adder 52 and to a first input of subtractor 53. The output of register 51 is connected to a second input of adder 52 and to a second input of subtractor 53. The output of adder 52 is connected to an input of register 54. An output of register 54 is connected to an input of register 57. An output of register 57 is connected to the output terminal 32 for delivering thereto a binary word of 16 bits representing the result A+B.

The output of subtractor 53 is connected to an input of register 55. An output of register 55 is connected to a data input of the barrel register 58. The barrel register 58 allows a 16 bit word to be shifted by a variable number of bits determined by a binary word applied to a control input. This binary word includes two bits and it is delivered by a first output of the ROM 56. An output of barrel register 58 is connected to an input of register 59. An output of register 59 is connected to a first input of multiplier 61. The ROM 56 has a second output connected to an input of register 60 for supplying thereto a 16 bit word, D1, and has a control input connected to the input terminal 29 for receiving a binary word of 5 bits forming an address for this ROM 56. An output of register 60 is connected to a second input of multiplier 61. An output of multiplier 61 is connected to an input of register 62. An output of register 62 is connected to the output terminal 33 so as to deliver thereto a binary word of 16 bits representing the result $(A-B) \times D$. Each of the registers of the computation circuit 28 has a clock input, not shown, receiving the clock signal produced by the control means 5.

Multiplication by the predetermined value D is performed, on the one hand, by means of the barrel register 58 producing a shift of 0, or 1, or 2, or 3 bits and, on the other hand, by means of multiplier 61. The ROM 56 delivers on the one hand a binary word D2 of 2 bits indicating the value of the shift to be performed by the barrel register 58 and, on the other hand, a binary word D1 of 16 bits forming an operand applied to the second input of the multiplier 61. The value of D is
$2^{D2} \times D1$.

During the computation shown in the diagram of FIG. 4, it is necessary to perform multiplications by the following coefficients:

$\frac{1}{2C_1} = 0.50220$    $\frac{1}{2C_9} = 0.78809$ $\frac{1}{2C_2} = 0.50977$    $\frac{1}{2C_{10}} = 0.89990$ $\frac{1}{2C_3} = 0.52246$    $\frac{1}{2C_{11}} = 1.06055$ $\frac{1}{2C_4} = 0.54102$    $\frac{1}{2C_{12}} = 1.30640$ $\frac{1}{2C_5} = 0.56689$    $\frac{1}{2C_{13}} = 1.72241$ $\frac{1}{2C_6} = 0.60132$    $\frac{1}{2C_{14}} = 2.56274$ $\frac{1}{2C_7} = 0.64673$    $\frac{1}{2C_{15}} = 5.10107$ $\frac{1}{2C_8} = 0.70703$ It is apparent that the coefficients $\frac{1}{2C_1}$ to $\frac{1}{2C_{10}}$ are between 0.5 and 1. Their representation with 0 bit for the whole part and 16 bits for the decimal part allows one and the same format to be kept for all the computations in the transform computing device. In fact, after multiplying by a value represented by 13 bits for the whole part and 3 bits for the decimal part, the result is a format including 13 bits for the whole part and 19 bits for the decimal part, which gives a format of 13 bits for the whole part and 3 bits for the decimal part after truncation limited to the 16 most significant bits. Keeping the format of 13 bits for the whole part and 3 bits for the decimal part throughout the computations simplifies the management of the adders and subtractors.

On the other hand, the coefficients $\frac{1}{2C_{11}}$ to $\frac{1}{2C_{15}}$ are greater than 1. This raises a problem for multiplication by one of these coefficients by a value represented in a format including 3 bits for the whole part and 13 bits for the decimal part would give a result whose format would have 16 bits for the whole part and 16 bits for the decimal part. This result would then have a format of 16 bits for the whole part and 0 bits for the decimal part after truncation limited to the 16 most significant bits. There would then be, following such a multiplication, a loss of the format including 13 bits for the whole part and 3 bits for the decimal part. Going over from the format including 13 bits for the whole part and 3 bits for the decimal part to the format including 16 bits for the whole part and 0 bit for the decimal part would cause a loss of precision for the format having 13 bits for the whole part and 3 bits for the decimal part was chosen so as to represent the majorant of all the numerical values met with during the computation, and so a format of 16 bits for the whole value is superfluous.

Taking into account these remarks, multiplication by the coefficients $\frac{1}{2C_{11}}$ to $\frac{1}{2C_{15}}$ is performed, on the one hand, by a shift of 1, 2 or 3 bits to the left on the value to be multiplied, so as to multiply this value by 2, 4 or 8 and, on the other hand, by multiplying the value thus obtained by a coefficient $\frac{1}{2C_{11}} \cdots \frac{1}{2C_{15}}$ previously divided by 2, or 4, or 8 respectively.

For multiplying by the coefficients $\frac{1}{2C_{11}}$, or $\frac{1}{2C_{12}}$, or $\frac{1}{2C_{13}}$, the shift performed is 1 bit to the left and the values of the coefficient applied to the second input of multiplier 61 are:

$$\frac{1}{2} \times \frac{1}{2C_{11}} \text{ or } \frac{1}{2} \times \frac{1}{2C_{12}} \text{ or } \frac{1}{2} \times \frac{1}{2C_{13}}$$

respectively.

For multiplying a value by $$\frac{1}{2C_{14}},$$

a shift of 2 bits to the left is performed by the barrel register 58 and multiplication by $$\frac{1}{4} \times \frac{1}{2C_{14}}$$

is performed by multiplier 61.

For multiplying a value by $$\frac{1}{2C_{15}},$$

a shift of 3 bits to the left is performed by the barrel register 58 and multiplication by $$\frac{1}{8} \times \frac{1}{2C_{15}}$$

performed by multiplier 61. Memory 56 stores 15 words of 18 bits, each word including two bits controlling a shift, possibly 0, and 16 bits representing the value of the coefficient to be applied to the second input of multiplier 61.

It should be noted that between the input terminal 30 and the output terminal 32 the values transit through three registers 53, 54, 57, whereas between the input terminal 31 and the output terminal 33 the numerical values transit through four registers 51, 55, 59, 62. Thus the results of the type (A−B)×D are delayed by one clock period with respect to the results of type A+B, so that these two results may be stored successively and not simultaneously in the memory for the first operands 21 or in the second operand memory 22, alternately.

FIG. 9 shows the block diagram of one embodiment of the computing means 7. These include two registers 67 and 68 having a capacity of a 16 bit word, and an adder 69. A data input of register 67 is connected to the input terminal 41 for receiving a 16 bit word. An output of register 67 is connected to a data input of register 68 and to a first input of adder 69. An output of register 68 is connected to a second input of adder 69. Each of the registers 67 and 68 has a clock input connected to the input terminal 42 for receiving the clock signal delivered by the control means 5. Adder 69 has an output connected to the output terminal 43 for delivering thereto a 16 bit word. Registers 67 and 68 are connected in series for delivering simultaneously to the adder 69 two values which are applied successively to the input terminal 41. For example, a sum of the form E+G is computed by applying successively E then G to the input terminal 41 during two successive periods of the clock signal. For computing a sum of the form (E+G)+H, it is sufficient to apply successively E, then G, then H to the input terminal 41 during three successive periods of the clock signal.

In this embodiment, multiplier 61 is formed of an integrated circuit Am 29517A manufactured by the firm AMD. The adders 52 and 69 are each formed of integrated circuits 74F374, 74F381 and 74F182 manufactured by the firm AMD. Subtractor 53 is formed of the same integrated circuits.

FIG. 10 shows a more detailed block diagram of the control means 5. The block diagram includes: clock 25 already mentioned above; a binary counter 50, counting from 0 to 31; a binary counter 51, counting from 0 to 511; a ROM 52; a ROM 53; and a decoder 54. Counters 50 and 51 have a clock input connected to the output of clock 25 and a reset input connected to the input terminal 2 receiving the synchronization signal corresponding to 16 successions of 16 values to be transformed. Counter 51 has an output connected to an address input of the ROM 53 and to an input of decoder 54. This output delivers a 9 bit word resulting from the counting. An output of decoder 54 delivers a synchronization signal corresponding to the beginning of a block of 16×16 transformed values, when counter 51 has counted 64 clock periods. This output is connected to the output terminal 13. An output of counter 51 is connected to the output terminal 13. An output of counter 50 is connected to an input of the ROM 52 for delivering thereto a 5 bit word. The ROM 52 has outputs delivering address values and reading and writing control signals to memories 24, 21, 22, 37, 56 and control signals to multiplexers 34, 35, 36. The ROM 53 has outputs delivering addresses to memories 44 and 45 as well as reading and writing control signals.

FIG. 11 shows the block diagram of one embodiment of an image coding device in accordance with the invention. This device includes, in series, two mono-dimensional direct cosine transform computing devices 73 and 74 constructed in accordance with the preceding description. The image coding device shown in FIG. 11 has an input terminal 71 receiving a succession of numerical values F(i, j) representing the luminance values of the pixels. These values are applied to the input of a device 72 for decomposing an image into blocks of 16×16 pixels corresponding to blocks of 16×16 luminance values. Device 72 delivers, for each block 16, successions of 16 values, each succession corresponding to an image line portion, and delivers a block synchronization signal to the transform computing device 73. The image coding device also includes a normalization device 75, a transform coding device 76 and an output terminal 77 delivering a succession of transformed values, coded so as to reduce the amount of information.

The input terminals 71 and 72 are connected respectively to an input for values to be transformed and to a synchronization input of device 73. Device 73 has a transformed value output and a synchronization output connected respectively to an input for values to be transformed and a synchronization input of device 74. Device 74 has a transformed value output and a synchronization output, connected respectively to a first and second input of the normalization device 75. Device 74 delivers a succession of transformed values F'(u), to device 75. The normalization device 75 has an output connected to an input of the transform coding device 76 so as to deliver thereto a succession of values F"(u, v) formed by the transformed values multiplied by predetermined coefficients called normalization coefficients.

The mono-dimensional direct cosine transform computing devices 73 and 74 each perform a succession of calculations corresponding to the diagram shown in FIG. 4. They deliver then transformed values F'(u, v)

which must each be multiplied by a predetermined coefficient so as to obtain the theoretical transformed values defined by the formula (1).

$$F'(u,v) = \sum_{i=0}^{15} \sum_{j=0}^{15} f(i,j) \cdot \cos\frac{(2j+1)\cdot v\cdot \pi}{32} \cdot \cos\frac{(2i+1)\cdot u\cdot \pi}{32} \quad (5)$$

whereas the theoretical value is:

$$F(u,v) = 4\frac{c(u)\cdot c(v)}{N^2} c(u)\cdot c(v) \sum_{i=0}^{15}\sum_{j=0}^{15} f(i,j) \cdot \cos\frac{(2j+1)\cdot v\cdot \pi}{32} \cdot \cos\frac{(2i+1)\cdot u\cdot \pi}{32} \quad (6)$$

so for N=16 the theoretical value is:

$$F(u,v) = 1/64 c(u).c(v).F'(u,v) \quad (7)$$

In practice, it is unimportant not to obtain the theoretical value F(u,v) on the other hand after decoding an exact value F(i,j) must be restored.

For decoding an image it is necessary to apply the reverse cosine transformation to the direct transformed values. The reverse cosine transformation is defined by the above mentioned formula (2). Computation of the reverse transforms may be performed using the algorithm of Beyeong Gi Lee, by reversing the time axes in the computation diagram shown in FIG. 1. The values thus obtained are equal to the reverse transformed values f(i,j) defined by FIG. 2, within a factor, which depends on the value considered. From formula (2), for blocks of 16×16 values, the exact value of each reverse transform is:

$$f(i,j) = \sum_{u=0}^{15}\sum_{v=0}^{15} c(u)\cdot c(v) \cdot F(u,v) \cdot \cos\frac{(2j+1)\cdot v\cdot \pi}{32} \cdot \cos\frac{(2i+1)\cdot u\cdot \pi}{32} \quad (8)$$

with $C(x) = 1/\sqrt{2}$ for x=0 and C(x)=1 for x≠0.

This value f(i,j) may be expressed as a function of the value F'(u,v) obtained by applying the algorithm of Beyeong Gi Lee twice, as represented by the formula (5):

$$f(i\cdot j) = \sum_{u=0}^{15}\sum_{v=0}^{15} \frac{1}{64} C^2(u)\cdot C^2(v) \cdot F'(u,v) \cdot \cos\frac{(2i+1)\cdot v\pi}{32} \cdot \cos\frac{(2i+1)\cdot u\cdot \pi}{32} \quad (9)$$

On the assumption that the coding is performed by applying the reversed algorithm of Beyeong Gi Lee twice to F'(u,v) the values obtained are of the form:

$$\sum_{u=0}^{15}\sum_{v=0}^{15} F'(u,v)\cdot \cos\frac{(2j+1)\cdot v\cdot \pi}{32} \cdot \cos\frac{(2i+1)\cdot u\cdot \pi}{32} \quad (10)$$

So that these values are equal to the values f(i,j) of the exact reverse transforms, it is sufficient for the values F'(u,v) supplied by device 74 to be multiplied by:

$$\frac{1}{64} \times C^2(u)C^2(v) = \frac{1}{256} \text{ for } u = 0 \text{ and } v = 0$$

$$\frac{1}{128} \text{ for } u \neq 0 \text{ and } v = 0,$$

and for $u = 0$ and $v \neq 0$;

$$\frac{1}{64} \text{ for } u \neq 0 \text{ and } v \neq 0$$

The normalization device 75 may then be inserted between the direct cosine transform computing devices 73, 74 and the reverse cosine transform computing devices, and must perform the following multiplications:

F(0,0) × 1/256

F(0,u) × 1/128

F(u,0) × 1/128

F(u,v) × 1/64

The multiplication coefficients are all powers of 2, so that these multiplications may be performed by means of a simple shift of the bits in a barrel register. On the contrary if the multiplication by 2.c(k) were performed in each of the mono-dimensional transform computing devices, this multiplication would be complicated to achieve, for c(0)=1 is not a whole power of 2.

As mentioned above, the change of format of the output of a first mono-dimensional transform computing device at the input of a second causes a division by two of each transmitted value, so in order to compensate for this division by two the normalization device must in fact perform the following multiplications.

$$F''(0,0) = F'(0,0) \times 1/128$$

$$F''(0, u \neq 0) = F'(0, u \neq 0) \times 1/64$$

$$F''(v \neq 0.0) = F'(v \neq 0, u) \times 1/64$$

$$F''(u \neq 0, v \neq 0) = F'(u \neq 0, v \neq 0) \times 1/32$$

The construction of the normalization device 75 is within the scope of a man skilled in the art. It may be formed of a barrel register having a capacity of 16 bits and providing a shift of 2 bits or of 1 bit, or of 0 bit towards the right, taking into account a fixed shift of 5 bits corresponding to the multiplication by 1 which is a factor common to all the values F'(u,v). The number of shift bits is controlled by a counting device receiving a clock signal delivered by a clock common to devices 73 and 74 and reset by a synchronization signal delivered by device 74 when it delivers each succession of 16×16 transformed values F'(u,v).

The purpose of the transform coding device 76 is to reduce the amount of information to be transmitted. It may be constructed in accordance with the description given by:

IEEE Transactions on Communcications, VOL. COM-32, No. 3, March 1984, "Scene Adaptive Coder", by WEN-HSIUNG CHEN and WILLIAM K. PRATT.

Such coding consists in comparing the value of each transform with respect to a threshold value; in considering as null the transforms less than the threshold value; in transmitting the value of the non null transforms by a Huffman code and transmitting the addresses of these transforms in their matrices by means of span coding, the length of the spans being itself encoded by means of a Huffman code. Only the first value, F"(0,0) of the matrix of the transforms is transmitted in absolute value.

FIG. 12 shows the block diagram of a variant of this image encoding device. This variant includes additional elements for improving the accuracy of the transform computation, the other elements being unchanged and bearing the same numerical references as in FIG. 11. This variant includes: an input terminal 78 receiving a synchronization signal for each succession of 16×16 luminance values; an input terminal 79 receiving the successions of values to be transformed; a device 82 for computing a mean value for each succession of 16×16 luminance values; a delay device 80 providing a delay equal to the computing time of device 82; a subtractor 81; two mono-dimensional direct cosine transform computing devices 73 and 74; a normalization device 75; a multiplexer 84 with two inputs and one output; means 83 for controlling this multiplexer 84; an adder 85; a transform encoding device 76; and an output terminal 86.

The input terminal 79 is connected to an input of the delay device 80 and to an input of the device 82 for computing a mean value. Subtractor 81 has a first input connected to an output of the delay device 80, a second input connected to an output of device 82 and an output connected to the input for the values to be transformed of device 73. The output of computing device 82 is also connected to a first input of multiplexer 84. Multiplexer 84 also includes: a second input receiving a permanent 0 value, a control input connected to an output of the control means 83 and an output connected to a first input of adder 85.

The input terminal 78, receiving the synchronization signal, is connected to synchronization inputs of device 73 and means 83. An output for transformed values of device 73 is connected to an input for values to be transformed of device 74. A synchronization output of device 73 is connected to a synchronization input of device 74. An output for transformed values of device 74 is connected to an input of a normalizsation device 75. A synchronization output of device 74 is connected to a synchronization input of device 75. An output of the normalization device 75 is connected to a second input of adder 85. An output of this latter is connected to an input of the transform encoding device 76. An output of device 76 is connected to the output terminal 86.

Subtractor 81 allows the subtraction, from each of the luminance values of a block of 16×16 pixels, of the mean value of these luminance values. Devices 73 and 74 then process values to be transformed having more reduced dynamics, which increases the accuracy of the computations or reduces the number of bits used for representing the values to be transformed. In the latter case, the computing devices are simpler.

At the output of the normalization device 75, adder 85 allows an exact value F"(0,0) to be retrieved by adding the mean value supplied by the computing device 82 to the first transformed value supplied by the normalization device 75 for each of the blocks of 16×16 pixels. For the other values delivered by the normalization device 75, adder 85 receives a 0 value in place of the mean value, through multiplixer 84 and the control means 83. The control means 83 control the multiplexer 84 as a function of the rank of the transformed values delivered by the normalization device 75. Means 83 include a counting device receiving the clock signal from devices 73 and 74, and reset by means of a synchronization signal received at the input terminal 78.

For encoding color television images, it is sufficient to provide two identical encoding devices one of which processes the luminance values and the other of which processes a succession of color difference values, the values of the red color difference being inserted with the blue color difference values, then the total number of color difference values is equal to the total number of luminance values in accordance with the usual standards for the digitization of luminance signals and color difference signals.

FIG. 13 shows the block diagram of a variant of construction of the mono-dimensional cosine transform computing device of the invention. This variant has improved accuracy through the use of means similar to the means which have just been described. It includes: a mono-dimensional cosine transform computing device 187 similar to the one shown in FIG. 7 and it further includes: a device 182 for computing a mean value of a block of 16 values to be transformed; a delay device 180 providing a delay equal to the computing time of device 182; a subtractor 181; a multiplexer 184; means 183 for controlling the multiplexer 184; and an adder 185. An input terminal 179 is connected to an input of the delay device 180 and to an input of device 182 for computing a mean value, so as to deliver thereto successions of 16 values to be transformed f(i,j). Subtractor 181 has a first input connected to an output of the delay device 180, a second input connected to an output of device 182 and an output connected to an input terminal 1 of device 187 for delivering thereto values to be transformed. The output of computing device 182 is also connected to a first input of multiplexer 184; multiplexer 184 also has: a second input receiving a permanent zero value, a control input connected to an output of the control means 183 and an output connected to a first input of adder 185. A second input of adder 185 is connected to an output terminal of device 187 and an output is connected to an output terminal 186 for delivering thereto successions of 16 mono-dimensional transformed values.

An input terminal 178, receiving a synchronization signal coqrresponding to the beginning of each succession of 16 values to be transformed, is connected to a synchronization input of device 187 and to a synchronization input of means 183. An output terminal 13 of device 187 delivers another synchronization signal corresponding to the beginning of each succession of 16 transformed values, delivered by the output terminal 186.

Subtractor 181 subtracts, from each of the values of the succession of 16 values to be transformed, the mean value thereof. Device 187 then processes the values to be transformed having reduced dynamics, which increases the accuracy of the computations or else reduces the number of bits used for representiung the values to be transformed. In this latter case, the computing device 187 may be simplified.

At the output of device 187 adder 185 allows an exact value F'(0,0) to be retrieved by adding the mean value supplied by computing device 182 to the first transformed values supplied by device 187, for each succession of 16 transformed values. For the other values of each succession of 16 transformed values supplied by device 187, adder 185 receives a zero value in place of the mean value, through the multiplexer 184 and the control means 183. These latter control multiplexer 184 as a function of the rank of the transformed value delivered by device 187. They include a counting device receiving a clock signal from device 187, and which is reset by means of the synchronization signal received by the input terminal 178.

An additional improvement in the accuracy of computing the mono-dimensional transforms may be obtained by determining the format of these values not as a function of a majorant of the values to be transformed but as a function of the maximum effective value of these values to be transformed. It is then possible to shift the bits representing these values as much as possible to the left while avoiding the risks of overflow during computation. Naturally, an opposite shift must be performed at the output of the mono-dimensional transform computing device so as to come back to a given format.

FIG. 14 shows a block diagram of one embodiment which is a variant of the embodiment shown in FIG. 5 and which includes additional elements for improving the accuracy by these means. These additional elements are: three barrel registers 92, 93 and 94; a device 90 determining the maximum value in a succession of 16 values to be transformed; and a device 91 for determining a shift. Device 90 has an input connected to the input terminal 1 for receiving the successions of 16 values to be transformed. It has an output connected to an input of device 91 this latter calculates the number of bits, D, of a shift to be performed at the input of the computation means 6 such that the values processed in the computing means 6 never exceed the capacity of these computing means 6.

Thus, the format of the values applied to the computing means 6 is not fixed but is variable as a function of the maximum effective value among the 16 values of a succession of values to be transformed. The shift calculated by device 91 is performed by means of barrel registers 92 and 93 which are inserted between the output ports of the input memory 3 and the two operand inputs of the computing means 6. These registers 92 and 93 are controlled by a binary word delivered by an output of device 91.

The barrel register 94 is inserted between the output of the order change device 9 and the output terminal 11 of the mono-dimensional direct cosine transform computing device. Barrel register 94 receives the same binary control word as registers 92 and 93 but it performs a shift of D bits in the direction opposite to that performed by registers 92 and 93, so as to restore the transformed values in the fixed format, including 13 bits for the whole part and 3 bits for the decimal part.

This variant of construction concerns not only the first but also the second mono-dimensional cosine transform computing device forming an encoding device or an image decoding device by bi-dimensional cosine transformation. Thus, each mono-dimensional direct cosine transform computing device determines automatically the fixed format which will be used during the whole time for processing 16 values, by shifting as much as possible to the left the values to be transformed without causing an overflow during computation. This variant provides an improvement in the accuracy when the values to be transformed have low dynamics, while remaining simpler than a computing device with floating decimal point.

FIG. 15 shows the distribution in time of all the computing operations performed in accordance with Beyeong Gi Lee's algorithm, for the reverse mono-dimensional cosine transformation. These computing operations supply 16 values f(0), f(1), ... f(15) which are equal to the reverse transformed values of 16 transformed values F'(0), F'(8), F'(4), F'(12), F'(2), F'(10), F'(6), F'(14), F'(1), F'(9), F'(5), F'(13), F'(3), F'(11), F'(7), and F'(15) which are obtained by applying Beyeong Gi Lee's algorithm, modified or not, and which are equal, within a factor, to the 16 transformed values F(0), ... F(15), of the transformed values given by the theoretical formula (1). This diagram may be derived from the diagram shown in FIG. 1 and corresponding to the direct cosine transformation, by reversing the horizontal time axis. The operation shown in this diagram may be broken down into seven columns referenced COL. 1, COL. 2, ... COL. 7. Like Beyeong Gi Lee's algorithm for direct transformation, Beyeong Gi Lee's algorithm for reverse transformation requires a succession of different operations in each of the columns, which complicates the construction of the implementation device.

In order to simplify the construction of the implementation device, the reverse transformation algorithm is modified in a similar way, in accordance with FIG. 16. This modification allows a succession of identical operations to be obtained in column 4, column 5, column 6 and column 7 of the diagram. To describe this modification, references have been attributed to certain intermediate values supplied by the computing operations shown in FIG. 15. The intermediate values supplied by the computing operations of column 3 are referenced: J(0), J(8), J(4), J(12), J(2), J(10), J(6), J(14), J(1), J(9), J(5), J(13), J(3), J(11), J(7), J(15). The intermediate values supplied by the computing operations of column 4 are referenced K(0), ... (K15). The intermediate values supplied by the computing operation of column 5 are referenced L(0), ... L(15). The intermediate values supplied by the computing operations of column 6 are referenced M(0), ... M(15).

In FIG. 15, it can be seen that the computing operations of columns 5, 6 and 7 may be broken down into elementary operations consisting in calculating successively two values of the form $A+D.B$ and $A-D.B$ from two operand values A and B and a predetermined constant value D.

FIG. 17 shows for example an extract from FIG. 15 showing the calculation of the values M(0) and M(2) from two intermediate values L(0) and L(2) calculated previously and from a constant value $$\frac{1}{2 \cdot C2}.$$

The computing operations shown in columns 1, 2 and 3 of the diagram of FIG. 15 are simple additions or transmissions without modification.

The diagram of FIG. 15 is modified so that the elementary operations, of the type shown in FIG. 17, may be performed on two consecutively available operands. Consequently, the modification consists in modifying successively columns 4, 5, 6 and 7 so as to make consecutive the values forming the two operands of each of the elementary operations. In the example shown in FIG. 17 the modification will consist in modifying the order of computing operations in column 5 so that the intermediate values L(0) and L(2) are obtained consecutively so as to then perform immediately the elementary operation shown in FIG. 17. The modification of the computation diagram consists then of an assembly of elementary modifications consisting in permuting two intermediate values in the same column.

When these modifications are finished, the order of the intermediate values supplied by the columns is the following: the order of the values J(0), ... (J15) is not modified. The order of the values supplied by the computations of column 4 is: K(0), K(4), K(2), K(6), K(1), K(5), K(3), K(7), K(8), K(12), K(10), K(14), K(9), K(13), K(11), K(15). The order of the values supplied by the computations of column 5 is: L(0), L(2), L(1), L(3), L(8), L(10), L(9), L(11), L(4), L(6), L(5), L(7), L(12), L(14), L(13), L(15). The order of the values supplied by the computations of column 6 is: M(0), M(1), M(8), M(9), M(4), M(5), M(12), M(13), M(2), M(3), M(10), M(11), M(6), M(7), M(14), M(15).

With the very repetitive structure of this modified computing diagram 64 intermediate values may then be obtained corresponding to the four columns of identical operations, COL. 4, COL. 5, COL. 6 and COL. 7, using a single computing device having a first and second operand inputs receiving two values A and B, having a third operand input receiving a value D and having two outputs delivering respectively two values $A+D.B$ and $A-D.B$. If such a computing device delivers pairs of values at a rate twice that at which the transformed values are available, then a single computing device is sufficient for obtaining the 64 intermediate values during the time corresponding to 16 transformed values.

The result is then a very simple structure of the reverse transform computing device. The computing operations situated in columns 1, 2 and 3 are formed of 17 additions which may be performed easily during a time corresponding to 16 transformed values, if these computations are performed at a rate twice the rate at which the transformed values are available. As for the direct transformation, it should be noted that these additions are often chain additions. It is necessary to provide memories for storing the intermediate values which form alternately the results supplied by the computing devices and the values of the operands applied to these computing device.

FIG. 18 shows a block diagram of an embodiment of the mono-dimensional reverse cosine transform computing device of the invention. This embodiment includes: an input terminal 11' receiving successions of 16 numerical values which may be 16 mono-dimensional direct cosine transformed values or else 16 bi-dimensional direct cosine transformed values; in this latter case, two devices of the invention are associated in series so as to provide a bi-dimensional reverse transform computing device: an input terminal 2' receiving a synchronization signal; an order change device 9'; control means 5'; first and second intermediate value storage means 4' and 8'; first and second computing means 6' and 7'; an output terminal 1' delivering successions of 16 reverse transformed values, calculated in accordance with the computing diagram of FIG. 16; and an output terminal 13' delivering a synchronization signal.

The order change device 9' has a data input connected to the input terminal 11' for receiving each transformed value, in the form of a binary word of 16 bits and has an output connected to a first input of the storage means 8' for delivering thereto a 16 bit word. Means 8' have a second input connected to an output of the computing means 7' which delivers thereto a binary word of 16 bits. Means 8' have a first and second outputs coupled respectively to a first operand input and to a second operand input of the computing means 6', and have a third output connected to an input of the computing means 6' for delivering thereto a binary word of 16 bits. The storage means 4' have a first and second output coupled respectively to the first and second inputs of computing means 6' and coupled to the output terminal 1' of the reverse transform computing device. The computing means 6' have a first and second output connected respectively to a first and second input of means 4'.

The diagram of computations of FIG. 16 cannot be derived from the diagram of computations of FIG. 4 by simply inverting the horizontal time axis, however there are similarities with the diagram of FIG. 4, and these similarities correspond to certain similarities in the construction of the reverse transform computing device with respect to the structure of the direct transform computing device. The similar elements forming the reverse transform computing device bear the same numerical references as the direct transform computing device, but with the prime index.

The order change device 9' stores and changes the order of $16 \times 16$ transformed values received by the input terminal 11' for placing the values to be transformed into the order shown on the left of the computation diagram of FIG. 16: F'(0), F'(8), ... F'(7), F'(15). When two mono-dimensional reverse cosine transform computing devices are connected in series so as to form a bi-dimensional reverse cosine transform computing device, the first computing device includes an order change device 9' storing 16 successions of 16 direct transformed values which are generally available in the order shown in FIG. 6, the second computing device storing 16 successions of 16 transformed values which are supplied by the first device in the order of the lines, and restoring them in the order of the columns.

The purpose of the intermediate value storage means 8' is to store the intermediate values calculated by the computing means 7' and to restore them either to the input of these means 7' or to the two operand inputs of the computing means 6'. Means 7' and means 8' operate in a closed circuit for performing the computing operation situated in columns 1, 2 and 3 of the diagram of FIG. 16. Means 7' compute a value of the form $E+G$ from two operands E and G applied consecutively to its input, computing means 6' compute tow values $A+D.B$ and $A-D.B$ from two operands A and B applied consecutively to the two operand inputs. The arithmetic fucntion performed by the computing means 6' is then different from that performed by the computing means 6 of the direct transform computing device.

The intermediate value storage means 4' store the values calculated by means 6' and deliver them either to the operand inputs of these means 6' or to the output terminal 1' of the reverse transform computing device. Means 6' and 4' operate in a closed circuit for performing the computations situated in columns 5, 6 and 7 of the diagram of FIG. 16 then the reverse transformed values are delivered to the output terminal 1'. Control means 5' generate clock signals and control signals for the whole of the elements of the reverse transform computing device, in particular a clock signal controlling the computations at a rate twice that at which the transformed values are applied to the input terminal 11'. Means 5' receive from the input terminal 2' a synchronization signal corresponding to the beginning of each block of $16 \times 16$ direct transformed values applied successively to the input terminal 11'. They deliver to the output terminal 13' a synchronization signal corresponding to the beginning of each block of 16×16 reverse transformed values delivered by the output terminal 1'.

FIGS. 19 and 20 show a more detailed block diagram of this embodiment. Means 5' include a clock 25' delivering a clock signal whose frequency is 22.5 MHz and a sequencer 26'. Sequencer 26' is controlled by clock 25' for delivering control signals and the synchronization signal applied to the output terminal 13'. The order change device 9' is formed of two registers 43' and 46' and two RAMs 44' and 45'. Each of these memories has a capacity of 16×16 direct transformed values and they operate alternately, one being used for writing while the other is used for reading. Each of these memories is formed by four integrated circuits Cy 7C122 manufactured by Cypress.

Register 43' has an input forming the input of device 9' connected to the input terminal 11' and has an output connected to a data input of memory 44' and to a data input of memory 45'. Register 46' has an input connected to a data output of memory 44' and to a data output of memory 45' and has an output forming the output of device 9'.

Memories 44' and 45' each have an address input and a reading and writing control input, connected to a multiple output of means 5'. Register 43' has a control input, not shown, receiving a clock signal delivered by means 5' at the rate of the direct transformed values applied to the input terminal 11'. Register 46' has a control input, not shown, receiving a clock signal supplied by means 5' at a rate of 22.5 MHz corresponding to twice the rate at which the direct transformed values are applied to the input terminal 11'. The reading operations from memory 44' or from memory 45' are performed at a rate twice that of the writing operations in these memories. All the computations performed on the vlaues restored by device 0' are performed at a rate twice that at which the direct transformed values are applied to the input terminal 11'. The computing means 7' are identical to means 7 of the direct cosine transform computing device.

Means 8' include: three multiplexers 100 to 102 with two inputs and one output; two RAMs 103 and 104 with double addressing port and double output port. Multiplexers 100 and 101 have two first inputs connected to the first input of means 8', two second inputs connected to the second input of means 8' and two outputs connected respectively to a data input of memory 103 and to a data input of memory 104. Memories 103 and 104 each have two output ports which are referenced A1, A2 for memory 103 and B1, B2 for memory 104. Multiplexer 102 has a first input connected to the output port A1, a second input connected to the output port B2, and an output forming the output of means 8' which is connected to the input of computing means 7'.

The output ports A1 and B1 form the first output of means 8' and the output ports A2 and B2 form the second output of means 8'. Multiplexers 101 and 100 each have a control input connected to an output of the control means 5'. Each of memories 103 and 104 has a capacity of 16×16 values and is formed of four integrated circuits Am29707 manufactured by the firm AMD. It is possible to perform simultaneously a writing operation and a reading operation in each of these memories. Multiplexers 100 and 101 cause either direct transformed values delivered by means 9' or an intermediate value delivered by means 7' to be stored in memory 103 or 104. Multiplexer 102 causes either a value stored in memory 103 or a value stored in memory 104 to be delivered to the input of means 7'

The computing means 6' include: a multiplexer 107 with 8 inputs and two outputs; a computing circuit 108; and a multiplexer 109 with four inputs and two outputs. a first output of multiplexer 107 is connected to a first input, referenced A3, of the computing means 108. a second output of multiplexer 017 is connected to a second input, referenced B3 of the computing means 108. Four first inputs, referenced 0, 1, 2, 3 of multiplexer 107 may be placed in communciation with the first output. These four first inputs are connected respectively to the output ports A1 and B1 of memories 103 and 104 and to the output terminals 112 and 113 of the intermediate value storage means 4'. Four second inputs of multiplexer 107, referenced 0, 1, 2, 3, may be placed in comunication with the second output of this multiplexer 107 and are connected respectively to the output ports A2 and B2 of memories 103 and 104 and to the output terminals 122 and 123 of means 4'. Multiplexer 107 is controlled by a binary word of 2 bits P4, P5, supplied by an output of the control means 5'.

The multiplexer 109 has two first inputs connected respectively to a first and second output of the computing circuit 108, two second inputs connected respectively to the second and first output of circuit 108 and a first and a second output which may be placed in communication respectively with the first inputs or with the second inputs under the action of a control signal, these outputs forming the two outputs of the computing means 6' and being connected respectively to input terminals 114 and 115 of means 4'. Multiplexer 109 has a control input receiving a binary control signal PO delivered by an output of means 5'.

Multiplexer 107 allows the source to be selected for a value applied to input A3 and a value applied to input B3 of the computing circuit 108. There are four possible sources: memory 103, memory 104 and two memories forming the storage means 4' which will be described hereafter. With multiplexer 109, a permutation can be made of the two values delivered by the computing circuit 108 so as to direct them towards one of the two memories forming the storage means 4', alternately at the timing of the clock signal.

FIG. 20 shows a block diagram of the storage means 4'. They include: two memories 21' and 22', each itself formed of two memories; and a multiplexer 127 with four inputs and one output. Memory 21' is formed of two RAMs 124 and 125. Memory 24' is formed of two RAMs 126 and 127. Each of memories 124 and 127 has a capacity of 16 values of 16 bits. Their outputs are referenced repectively R1, R2, R3, R4. The four inputs of multiplexer 128 are referenced 0, 1, 2, 3 and may be placed in communication with its output forming an output of the storage means 4' and being connected to the output terminal 1'. The multiplexer has a control input connected to an output of means 5'. It is controlled by the binary word P4, P5 like multiplexer 107.

The output R1 of memory 124 is connected to the output terminal 112 of means 4' and the input 0 of multiplexer 128. The output R2 of memory 125 is connected to the output terminal 113 of means 4' and to the input 2 of multiplexer 128. The output R3 of memory 126 is connected to the output terminal 122 of means 4' and to the input 1 of multiplexer 128. The output R4 of memory 127 is connected to the output terminal 123 of means 4' and to the input 3 of multiplexer 128. Each of memories 124 to 127 is formed of four integrated circuits Am29707 whose second output ports are not used. These memories 124 to 127 each have a reading addressing port, a writing addressing port and a reading and writing control input, connected to outputs of the control means 5'. Memories 124 and 125 are controlled alternately for writing and reading so as to store then restore the results of the form A+B.D. Similarly, memories 126 and 127 are used alternately for reading and writing for storing and restoring the results of the form A−D.B calculated by means 8'. When a result forms a reverse transformed value, multiplexer 128 transmits this value to the output terminal 1'. All the control signals delivered by the control means 5' have a period equal to 32 periods of the clock signal controlling the computations.

FIG. 21 shows a block diagram of one embodiment of the computing circuit 28 which includes: nine registers, 130, 131, 134, 135, 137, 138, 141, 142, 143, each having a capacity of one value of 16 bits; a barrel register 133; a ROM 132; an adder 139; a subtractor 140. Three input terminals: 29', 30', 31' receive respectively an operand A represented by 16 bits, an operand B represented by 16 bits and a control word represented by 65 bits and supplied by the control means 5'. Register 130 has an output connected to an input of register 137. Register 131 has an output connected to an input of the barrel register 133. Register 134 has an input connected to an output of the barrel register 133 and has an output connected to a first input of multiplexer 136. Register 135 has an input connected to a data output of the ROM 132 delivering a 16 bit word D1 and has an output connected to a second operand input of multiplexer 136.

The barrel register 133 has a shift control input connected to a data output of the ROM 132 delivering a binary word of 2 bits D2. Register 138 has an input connected to an output of multiplexer 136 delivering a binary word of 16 bits representing the value D.B and has an output connected to a first input of adder 139 and to a first input of subtractor 140. Register 137 has an output connected to a second input of adder 139 and to a second input of substractor 140. Register 141 has an input connected to an output of adder 139 and an output forming the first output of circuit 28' and connected to the input terminal 114 of means 4' for delivering thereto the value A.D.B. Register 142 has an input connected to an output of substractor 140 and has an output connected to an input of register 143. This latter has an output forming the second output of circuit 28' and being connected to the input terminal 115 of means 4' for delivering thereto the value A−D.B. Multiplexer 136 is formed of an integrated circuit Am29517 manufactured by AMD. Adder 139 and substractor 140 are each formed by means of integrated circuits 74F374, 74F381 and 74F182 manufactured by AMD.

In the whole of the mono-dimensional reverse cosine transform computing device the numerical values have a format of 10 bits for the whole part, including the sign, and 6 bits for the decimal part. This format was chosen for it allows the maximum value of the direct transformed values, of the intermediate values and of the reverse transformed values to be represented without overflow.

Multiplication of the operand B by a predetermined value D is performed, on the one hand, by means of the barrel register 133 producing a shift of 0, or 1, or 2, or 3 bits and, on the other hand, by means of the multiplier 136. Memory 132 supplies, on the one hand, a binary word D2 of 2 bits indicating the value of the shift to be performed and, on the other hand, a binary word D1 of 16 bits forming an operand applied to the second input of multiplier 136. The value of D is equal to $2^{D2} \times D_1$.

The values D are those indicated in the diagram of the computation shown in FIG. 16. The multiplier 136, the barrel register 133 and the ROM 132 allow the predetermined format for the numerical values to be maintained, 10 bits for the whole part and 3 bits for the decimal part, for an operation similar to that described for the computing circuit 28 of the direct transform computing device.

Registers 130, 131, 134, 135, 137, 138, 141, 142, 143 each have a clock input receiving the clock signal delivered by the control means 5'. The purpose of register 143 is to delay the value A−D.B by a clock period with respect to the value A−D.B determined from the same operand values A and B, so as to store them successively and not simultaneously in memory 21' and in memory 22'.

FIG. 22 shows the block diagram of a device for decoding images which have been coded by a bi-dimensional direct cosine transformation. This device includes in series: a device 150 for decoding the bi-dimensional direct cosine transformed values; two mono-dimensional reverse cosine transform computing devices 151 and 152; an adder 153; and a device 154 for reconstituting the image line. An input terminal 149 receives blocks of 16×16 coded values representing blocks of 16×16 bi-dimensional direct cosine transformed values by using the coding carried out for example in accordance with the method described in: IEEE Transactions on Communications, VOL. COM-32, No. 3, March, 1984, "Scene Adaptative Coder" by WEN-HSIUNG CHEN and William K. PRATT.

The decoding device 150 decodes the coded values by a method which is the reverse of this coding process and which is described in the same document, and device 150 delivers decoded values to a first input of device 151. The decoding device 150 also delivers a synchronization signal to a second input of device 151, for each block of 16×16 decoded values which it delivers thereto. Device 151 performs a mono-dimensional cosine transformation in lines, successively on 16 successions of 16 values, for each packet. It delivers to a first input device 152 a packet formed of 16 successions of 16 values, accompanied by a synchronization signal applied to a second input of device 152. Device 152 performs a mono-dimensional reverse cosine transformation in columns successively on the 16 successions of 16 values of the packet delivered by device 151.

Device 152 has an output connected to a first input of adder 153 and delivering a binary word of 16 bits, of value Y, 10 bits representing the whole part including the sign of Y and 6 bits representing the decimal part. A second input of adder 153 receives a bit which is the sign bit of the value Y, referenced sign(Y). Adder 153 adds the sign bit of Y to the 16 bits representing Y, by giving to the bit to be added, sign (Y), a rank which corresponds to the MSB in the decimal part, that is to say the sixth rank from the right. Adder 153 thus adds to Y a value equal to 0.5 when Y has a negative value and thus statistically improves the accuracy of the restoration of the luminance values, for a statistical study of the coding and decoding errors has shown that there is statistically one error per defect which may be reduced by adding to each decoded luminance value a correction value equal to 0.5 when the value Y is negative and equal to 0 when the value Y is positive.

Adder 153 has an output delivering a binary word of 16 bits representing a luminance value, 10 bits representing the whole part of the signal, 6 bits representing the decimal part. The two MSBs and the bits of the decimal part allow the values of Y which are negative, or greater than 255 to be detected and clipped. With the luminance values restored by blocks of 16×16 values corresponding to square blocks of 16×16 pixels, it is necessary to reconstitute a succession of luminance values corresponding to the usual order of analysing an image, that is to say corresponding to each point of a line successively, for each line successively. This role is filled by the line restoration device 154 which puts back in order the luminance values f(i,j) then delivers them to an output terminal 155 of a decoding device.

The invention may be applied particularly for coding and decoding television images in a digital video tape recorder.

What is claimed is:

1. A mono-dimensional direct cosine transform computing device comprising:

an input memory for storing a succession of 16 values to be transformed;

first computing means, coupled to the input memory at first and second inputs thereof for computing two intermediate values of the form A+B and (A−B)×D and providing said two values at first and second outputs thereof, where A and B are two operands applied respectively to two inputs thereof and where D is a predetermined and positive coefficient;

first means coupled to the outputs of said first computing means for storing said intermediate values, and for delivering values which have been previously calculated as operands to the inputs of said first computing means;

second computing means for calculating a value of the form E+G, where E and G are two predetermined operands applied consecutively to an input of said second computing means;

second means coupled to said second computing means, for storing said E+G value and for delivering values which have been calculated previously as operands to said second computing means, said second means coupled to the outputs of said first computing means for storing said intermediate values, and coupled to an output terminal of the transform computing device, for delivering thereto a succession of 16 transformed values; and control means for controlling the input memory, the first and second means, and the first and second computing means, by means of control signals having a rate twice that of the values to be transformed and having a period corresponding to said succession of 16 values to be transformed, and by means of a clock signal having a rate double that of the values to be transformed.

2. The device as claimed in claim 1, wherein said first and second means and said first and second computing means process the intermediate values in a format where the place of a decimal point is predetermined.

3. The device as claimed in claim 2, wherein the place of the decimal point is predetermined as a function of a majorant of all the values of all the successions of 16 values to be transformed.

4. The device as claimed in claim 2, wherein, for improving the accuracy of the computations, the place of the decimal point is predetermined before the computation of the transforms of each succession of 16 values to be transformed, as a function of a maximum value of each succession, said device further comprising:

means for determining a maximum value from said 16 values to be transformed;

means for computing, from this maximum value, a shift value D corresponding to a largest leftward shift applicable to said values to be transformed without causing overflow during computation of the transforms;

a first and a second barrel register for shifting leftward by D bits each of said values applied to a first and to a second input of said first computing means;

a barrel register for shifting values delivered by a first output of said second means rightward by D bits.

5. The device as claimed in claim 1, wherein said first computing means includes:

a computing circuit receiving the two values A and B and delivering the two values A+B and (A−B)×D, the value A+B being delayed by a time equal to a clock period;

multiplexers transmitting these two values respectively to a first and a second output of said first computing means while permuting the transmitted values, at the rate of the clock signal;

and said first means includes two distinct memories for storing separately the values delivered respectively by the first and second outputs of said first computing means then delivering them respectively to the first input and to the second input of said first computing means.

6. The device as claimed in claim 1 wherein the input memory includes a random access memory (RAM) having an input port coupled to an input terminal receiving the values to be transformed, a first and second output port forming respectively a first and second output of said input memory, control inputs and two addressing ports coupled to said control means; the control means controlling the writing of 16 values to be transformed, at the rate at which they are delivered to the transform computing device, and controlling reading thereof at the rate of the clock signal.

7. The device as claimed in claim 1, wherein said second means includes:

two random access memories each having a data input port, two addressing ports, a data output port and a control input coupled to an output of the control means;

multiplexing means for coupling the two data input ports to outputs of the first and second computing means and for coupling the two data output ports to an input of said second computing means and to the output terminal of the transform computing device; and wherein the control means control the multiplexing means and the two memories for:

writing into the memories pairs of values delivered by the first computing means during the first 16 clock periods;

reading out, from the memories of said second means, 16 intermediate values to be delivered to said second computing means and 16 transformed values to be delivered to the output terminal; and writing into the memories 16 values delivered by said second computing means during 16 other clock periods.

8. The device as claimed in claim 1, wherein said first computing means includes:
a multiplier,
a barrel register connected to one input of the multiplier,
a read only memory connected to another input of the multiplier,
and, for performing a multiplication of a value (A−B) by a value D, while obtaining a result having a same format as (A−D), the read only memory delivering a predetermined value $D_1$ to said another input of the multiplier and a predetermined value D2 to a control input of the barrel register for controlling a leftward shift of D2 bits of the contents of this register, the value $D_1$ being positive and less than or equal to 1 and value D2 being a positive integer or zero such that $2^{D2} \times D_1 = D$ and such that the barrel register delivers a value (A−B), shifted leftward by D2 bits, to said one input of the multiplier which produces said value (A−B)×D as an output.

9. The device as claimed in claim 1, which, for improving the accuracy of the computation, includes means for obtaining a mean value of said 16 values to be transformed, means, coupled to said obtaining means, for subtracting from each value of a succession of 16 values to be transformed, before their transformation, the mean value; and means, coupled to said obtaining means, for adding this mean value to the transformed value corresponding to this mean value.

10. The device as claimed in claim 1, wherein an output of said second means is coupled to the output terminal of the transform computing device by means of an order changer device changing the order of the transformed values, said order changer device having a capacity of 16×16 values and controlled by the control means with a period corresponding to said 16×16 values to be transformed.

11. A device for coding images by bi-dimensional cosine transformation comprising two connected mono-dimensional cosine transform computing devices, each said cosine transform computing device comprising:
an input memory for storing a succession of 16 values to be transformed;
first computing means, coupled to the input memory at first and second inputs thereof, for computing first and second intermediate values of the form A+B and (A−B)×D and providing said first and second values at two outputs thereof, where A and B are two operands applied respectively to first and second inputs thereof and where D is a predetermined and positive coefficient;
first means, coupled to the outputs of said first computing means, for storing said intermediate values, and for delivering values which have been previously calculated as operands to the inputs of said first computing means;
second computing means for calculating a value of the form E+G, where E and G are two predetermined operands applied consecutively to an input of said second computing means;
second means, coupled to said second computing means, for storing said E+G value and for delivering values which have been calculated previously as operands to said second computing means, said second means coupled to the outputs of said first computing means for storing said intermediate values, and coupled to an output terminal of the transform computing device, for delivering thereto a succession of 16 transformed values; and
control means for controlling the input memory, the first and second means, the first and second computing means, by means of control signals having a rate twice that of the values to be transformed and having a period corresponding to a succession of 16 values to be transformed, and by means of a clock signal having a rate double that of the values to be transformed.

12. The coding device as claimed in claim 11, including, for improving the accuracy of the coding, means for obtaining a mean value of the 16×16 values to be transformed, means, coupled to said obtaining means, for subtracting from each of the values to be transformed, representative of a block of 16×16 pixels before coding thereof, the mean value and means, coupled to said obtaining means, for adding this mean value to the transformed value corresponding to this mean value.

13. A mono-dimensional reverse cosine transform computing device, said device comprising:
first computing means supplying an intermediate value of the form E+G, where E and G are two predetermined operands applied consecutively to an input of said first computing means;
first means for storing said intermediate value, coupled to an input and to an output of the first computing means for delivering thereto, as operands, values which have been calculated previously, and coupled to an input terminal receiving values to be transformed;
second computing means, coupled to the first means, for calculating two intermediate values of the form (A+D.B) and (A−D.B) and providing said two values at respective first and second output terminals, where A and B are two operands respectively applied to first and second inputs of said second computing means and where D is a predetermined coefficient;
second means, coupled to the outputs of said second computing means, for storing said intermediate values, coupled to the inputs of said second computing means for delivering thereto, as operands, values which have been calculated previously, and coupled to an output terminal of the reverse cosine transform computing device for delivering to this output terminal a succession of 16 reverse transformed values; and
control means for controlling the first and second means and the first and second computing means using control signals having a rate twice that of the values to be transformed and having a period corresponding to a succession of 16 values to be transformed, and by means of a clock signal having a rate twice that of the values to be transformed.

14. The device as claimed in claim 13, wherein in first and second means and said first and second computing means, the intermediate values processed, all have a format in which a position of a decimal point is predetermined.

15. The device as claimed in claim 14, wherein the place of the decimal point is predetermined as a function of a majorant of all the values of all the successions of 16 values to be transformed.

16. The device as claimed in claim 13, wherein said second computing means includes:

a computing circuit receiving the two operands A and B and delivering two values (A+D.B) and (A−D.B), the value (A−D.B) being delayed by a time equal to a clock period;

multiplexers transmitting said two values (A+D.B) and (A−D.B) respectively to the first and second outputs of said second computing means, while permuting the values transmitted at a timing of the clock signal;

said second means includes two distinct memories for storing separately the values delivered respectively by the first and second outputs of said second computing means, then delivering the values respectively to the first and second inputs of said second computing means.

17. The device as claimed in claim 13, wherein said first means includes:
two random access memories each having a data input port, two addressing ports, two data output ports and control inputs coupled to outputs of said control means;

multiplexing means for coupling the data input ports of the two random access memories to an output of the first computing means and to an input terminal of the reverse cosine transform computing device and for coupling the two data output ports to inputs of said second computing means.

18. A device as claimed in claim 13, wherein said second computing means includes:
a multiplier,
a barrel register, having an output coupled to one input of the multiplier, and
a read only memory, providing outputs to another input of the multiplier and to a control input of said barrel register, and, for performing a multiplication of a value B by a value D, while obtaining a result having the same format as B, the read only memory delivers a predetermined value D1 to said another input of the multiplier and a predetermined value D2 to said control input of the barrel register for controlling a leftward shift of E2 bits of the value B contained in this register, the value D1 being positive and less than or equal to 1 and the value D2 being a positive integer or zero such that $2^{D2} \times D_1 = D$ the barrel register delivers a value B shifted leftward by D2 bits to said one input of the multiplier.

19. A device as claimed in claim 13, further including an order changing device for changing the order of the values to be transformed, said order changing device having a capacity of 16×16 or 256 values, coupling an input of the intermediate value storage means to an input terminal of the transform computing device and controlled by the control means with a period corresponding to 16×16 values to be transformed.

20. A device for decoding images by bi-dimensional cosine transformation including two connected mono-dimensional reverse cosine transform computing devices, each comprising
first computing means supplying an intermediate value of the form E+G, where E and G are two predetermined operands applied consecutively to an input of said first computing means;

first means for storing said intermediate value, coupled to an input and to an output of the first computing means for delivering thereto, as operands, values which have been calculated previously, and coupled to an input terminal receiving values to be transformed;

second computing means, coupled to the first means, for calculating two intermediate values of the form (A+D.B) and (A−D.B) and providing said two values at first and second output terminals, where A and B are two operands respectively applied to said first and second inputs of said second computing means and where D is a predetermined coefficient;

second means, coupled to said second computing means, for storing said intermediate values, coupled to the inputs of said second computing means for delivering thereto, as operands, values which have been calculated previously, and coupled to an output terminal of the reverse cosine transform computing device for delivering to this output terminal a succession of 16 reverse transformed values; and control means for controlling the first and second means and the first and second computing means using control signals having a rate twice that of the values to be transformed and having a period corresponding to a succession of 16 values to be transformed, and by means of a clock signal having a rate twice that of the values to be transformed.

21. The decoding device as claimed in claim 20, including, for improving the accuracy of the coding, means for adding to each of the reverse transformed values, Y, a value equal to 0.5×sign (Y), where sign (Y) is the value of the sign bit of Y, and Y is a value of luminance.

* * * * *